(12) United States Patent
Meyn et al.

(10) Patent No.: US 10,692,158 B2
(45) Date of Patent: Jun. 23, 2020

(54) USING LOADS WITH DISCRETE FINITE STATES OF POWER TO PROVIDE ANCILLARY SERVICES FOR A POWER GRID

(71) Applicants: University of Florida Research Foundation, Incorporated, Gainesville, FL (US); INRIA (French Institute for Research in Computer Science and Automation), Paris (FR)

(72) Inventors: Sean Meyn, Gainesville, FL (US); Ana Busic, Paris (FR)

(73) Assignees: University of Florida Research Foundation, Incorporated, Gainesville, FL (US); INRIA (French Institute for Research in Computer Science and Automation), Paris (FR)

( * ) Notice: Subject to any disclaimer, the term of this patent is extended or adjusted under 35 U.S.C. 154(b) by 193 days.

(21) Appl. No.: 15/740,328

(22) PCT Filed: Jul. 1, 2016

(86) PCT No.: PCT/US2016/040639
§ 371 (c)(1),
(2) Date: Dec. 27, 2017

(87) PCT Pub. No.: WO2017/004487
PCT Pub. Date: Jan. 5, 2017

(65) Prior Publication Data
US 2018/0189899 A1    Jul. 5, 2018

Related U.S. Application Data

(60) Provisional application No. 62/187,803, filed on Jul. 1, 2015.

(51) Int. Cl.
*G06Q 50/06* (2012.01)
*H02J 3/14* (2006.01)
(Continued)

(52) U.S. Cl.
CPC ............... *G06Q 50/06* (2013.01); *H02J 3/14* (2013.01); *H02J 3/28* (2013.01); *H02J 3/386* (2013.01);
(Continued)

(58) Field of Classification Search
CPC ........ H02J 13/14; H02J 3/386; H02J 13/0006; H02J 2003/007; H02J 3/28;
(Continued)

(56) References Cited

U.S. PATENT DOCUMENTS 4,780,917 A     11/1988  Hancock
2002/0130557 A1*  9/2002  Dickhoff ............. H01H 47/004
                                                      307/113

(Continued)

FOREIGN PATENT DOCUMENTS

WO    WO 2017/004487 A1    1/2017

OTHER PUBLICATIONS

"Agricultural Demand Response Program in California Helps Farmers Reduce Peak Electricity Usage, Operate More Efficiently Year—Round," M2M Communications, 3 pages, (2011). [Author Unknown].
(Continued)

*Primary Examiner* — Alfonso Perez Borroto
*Assistant Examiner* — Esayas G Yeshaw
(74) *Attorney, Agent, or Firm* — Alston & Bird LLP

(57) ABSTRACT

A system, method and apparatus for providing ancillary services to a power grid using a power consumption component at a customer premises. The apparatus may control a load with discrete, finite states of power or an on/off load at a customer premises using a controller. The controller may
(Continued)

comprise a processor, which may be configured to receive a regulation signal associated with an ancillary service for the power grid; determine whether to modify a state of power of the power consumption component based on a probability function, local measurement at the premises, and the received regulation signal; and based at least in part on a determination to modify the state of power of the power consumption component, modify the state of power of the power consumption component. The system may be distributed, with different controllers at different customer premises independently making power state decisions.

29 Claims, 17 Drawing Sheets

(51) Int. Cl.
    *H02J 3/38* (2006.01)
    *H02J 13/00* (2006.01)
    *H02J 3/28* (2006.01)
(52) U.S. Cl.
    CPC ....... *H02J 13/0006* (2013.01); *H02J 2203/20* (2020.01); *Y02B 70/3225* (2013.01); *Y02E 10/763* (2013.01); *Y02E 40/72* (2013.01); *Y02E 60/76* (2013.01); *Y04S 10/123* (2013.01); *Y04S 20/222* (2013.01); *Y04S 40/22* (2013.01)
(58) Field of Classification Search
    CPC ... Y02B 70/3225; Y02E 10/763; Y02E 60/76; Y02E 40/72; Y04S 10/123; Y04S 20/222; Y04S 40/22; G06Q 50/06
    See application file for complete search history.

(56) References Cited

U.S. PATENT DOCUMENTS

| | | | |
|---|---|---|---|
| 2007/0213878 A1 | 9/2007 | Chen | |
| 2010/0314942 A1 | 12/2010 | Talkin et al. | |
| 2011/0196546 A1 | 8/2011 | Muller et al. | |
| 2013/0218825 A1* | 8/2013 | Zhang | G06Q 10/04 706/52 |
| 2013/0282181 A1* | 10/2013 | Lu | H02J 3/14 700/275 |
| 2014/0339316 A1 | 11/2014 | Barooah et al. | |

OTHER PUBLICATIONS

Braun et al., "Whole Building Control System Design and Evaluation: Simulation-Based Assessment," Cross-Task Team on Optimal Building Controls Design and Platform, Purdue University, 128 pages, (2012).
Braun, "Reducing energy costs and peak electrical demand through optimal control of building thermal storage," Controls Research, Johnson Controls, Inc., 96(2):876-888, (1990).
Brooks et al., Demand dispatch, IEEE Power and Energy Magazine, 8(3):20-29, (2010).
Callaway et al., "Achieving controllability of electric loads," Proceedings of the IEEE, 99(1):184-199, (2011).
Christakou et al., "GECN: primary voltage control for active distribution networks via real-time demand-response," IEEE Trans. on Smart Grid, 5(2):622-631, (2014).
Eyer et al., "Energy storage for the electricity grid: Benefits and market potential assessment guide," Sandia National Laboratories, Report No. SAND2010-0815, 232 pages, (2010).
Goyal et al., "A Method for Model-Reduction of Nonlinear Building Thermal Dynamics of Multi-Zone Buildings," Proceedings of the American Control Conference, AACC, pp. 2077-2082, (2012).

Hao et al. "Ancillary service to the grid through control of fans in commercial building HVAC systems," IEEE Trans. on Smart Grid, 5(4):2066-2074, (2014).
Hao et al., "How demand response from commercial buildings will provide the regulation needs of the grid," In 50th Allerton Conference on Communication, Control, and Computing, pp. 1908-1913, (2012).
Hirst et al., "Ancillary Services," 1996 Proceedings of the American Power Conference, Oak Ridge National Laboratory, 7 pages, (1996).
Kirby, "Frequency regulation basics and trends," Oak Ridge National Laboratory, 24 pages, (2004).
Koch et al., "Modeling and control of aggregated heterogeneous thermostatically controlled loads for ancillary services," Proc. PSCC, pp. 1-7, (2011).
Kundu et al., "Modeling and control of thermostatically controlled loads," 17th Power Systems Computation Conference, Stockholm Sweden, (2011).
Lin et al., "Identification of control-oriented thermal models of rooms in multi-room buildings," IEEE Conference on Decision and Control, (2012).
Makarov et al., "Assessing the Value of Regulation Resources Based on Their Time Response Characteristics," Pacific Northwest National Laboratory, 83 pages, (2008).
Makarov et al., "Operational Impacts of Wind Generation on California Power Systems," IEEE Transactions on Power Systems, 24(2):1039-1050, (2009).
Mathieu et al. "State estimation and control of electric loads to manage real-time energy imbalance," IEEE Trans. Power Systems, 28(1):430-444, (2013).
Mathieu et al., "State Estimation and Control of Heterogeneous Thermostatically Controlled Loads for Load Following," 2012 45th Hawaii International Conference on System Sciences, IEEE, pp. 2002-2011, (2012)
Meyn et al., "The value of volatile resources in electricity markets," 49th IEEE Conference on Decision and Control, pp. 1029-1036, (2010).
Meyn, et al. "Ancillary service to the grid using intelligent deferrable loads," IEEE Trans. on Auto. Control, 60(11):2847-2862, (2015).
Negrete-Pincetic et al., "The value of volatile resources in electricity markets," Sustainable Energy, Grids and Networks, 11:46-57, (2017).
Schweppe, et al., "Homeostatic Utility Control," IEEE Transactions on Power Apparatus and Systems, PAS-99(3):1151-1163, (1980).
Smith et al., "Utility Wind Integration and Operating Impact State of the Art," IEEE Transactions on Power Systems, 22(3):900-908, (2007).
Todd et al., "Providing Reliability Services through Demand Response: A Preliminary Evaluation of the Demand Response Capabilities of Alcoa Inc.," Alcoa Power Generating, Inc., (2009)
Vu et al., "Benefits of fast-response storage devices for system regulation in ISO markets," IEEE Power Energy Society General Meeting, pp. 1-8, (2009).
Watson et al., "Strategies for demand response in commercial buildings," In Proceedings of the 2006 ACEEE Summer Study on Energy Efficiency in Buildings, 14 pages, (2006).
Xu et al., "Peak demand reduction from pre-cooling with zone temperature reset in an office building," 13 pages, (2004).
Xu et al., "Peak demand reduction from pre-coding with zone temperature reset in an office building," Proceedings from the ACEEE 2004 Summer Study on Energy Efficiency in Buildings, 11pages, (2004).
WIPO Application No. PCT/US2016/040639, PCT International Preliminary Report on Patentability dated Jan. 2, 2018.
WIPO Application No. PCT/US2016/040639, PCT International Search Report and Written Opinion of the International Searching Authority dated Oct. 4, 2016.

\* cited by examiner

USING LOADS WITH DISCRETE FINITE STATES OF POWER TO PROVIDE ANCILLARY SERVICES FOR A POWER GRID

RELATED APPLICATIONS

Foreign priority benefits are claimed under 35 U.S.C. § 119(a)-(d) or 35 U.S.C. § 365(b) of U.S. application No. 62/187,803, filed Jul. 1, 2015.

GOVERNMENT SUPPORT

This invention was made with government support under grant number CPS1135843 awarded by the National Science Foundation. The government has certain rights in the invention.

BACKGROUND

The proper functioning of a power grid requires continuous matching of supply and demand in the grid, in spite of the randomness of electric loads and the uncertainty of generation. To operate the grid reliably today, various "ancillary services" are used to compensate for the supply-demand imbalance. Examples of ancillary services are automatic generation control (AGC), contingency reserves, and the balancing reserves used in the U.S. Pacific Northwest.

SUMMARY

Some embodiments provide a framework to utilize residential or commercial loads to provide ancillary services to a power grid. For example, modulating the setpoint for a refrigerator, water heater, or a chiller tank up and down will result in variations in power consumption. If the frequency and magnitude are within appropriate bounds, this will not adversely impact the service the load is intended to provide. In these three examples, the temperature will not deviate from prespecified bounds, in spite of these deviations in power consumption. Another example is the pool filtration system in residential pools, which ammounts to a 1 GW (one million watt) load in Florida, and even greater in California. The flexibility of power consumption can be used to provide substantial ancillary service. In each of these scenarios, the load has discrete, finite states of power (e.g., on/off, or high/medium/low/off). The method makes it possible for a large collection of loads to continuously supply ancillay service to the grid, even though each load is limited to a small number of operating points.

Embodiments of the method may employ a computer processor that receives as inputs the state of the environment. The processor may also be configured to receive a regulation signal associated with an ancillary service for the power grid. The method determines whether to modify a state of power of the power consumption component based on the regulation signal, and environmental variables such as the temperature of the load and its surroundings. Potentially millions of loads will receive the same regulation signal from the grid.

In some embodiments of the method, automated decision making at the processor involves randomization. The probability function that defines this randomization can be designed so that the collection of loads provides high quality ancillary service that varies continuously as needed for stable grid operation. The probability function that defines this decision making process may be designed so that the grid operator obtains highly reliable ancillary service, while meeting quality of service constraints at each load.

Additional embodiments provide a system for several classes of loads. A probability function may be designed for each class, and each class of loads may receive a distinct regulation signal from the grid.

The foregoing is a non-limiting summary of the invention.

DETAILED DESCRIPTION

Figure 1:
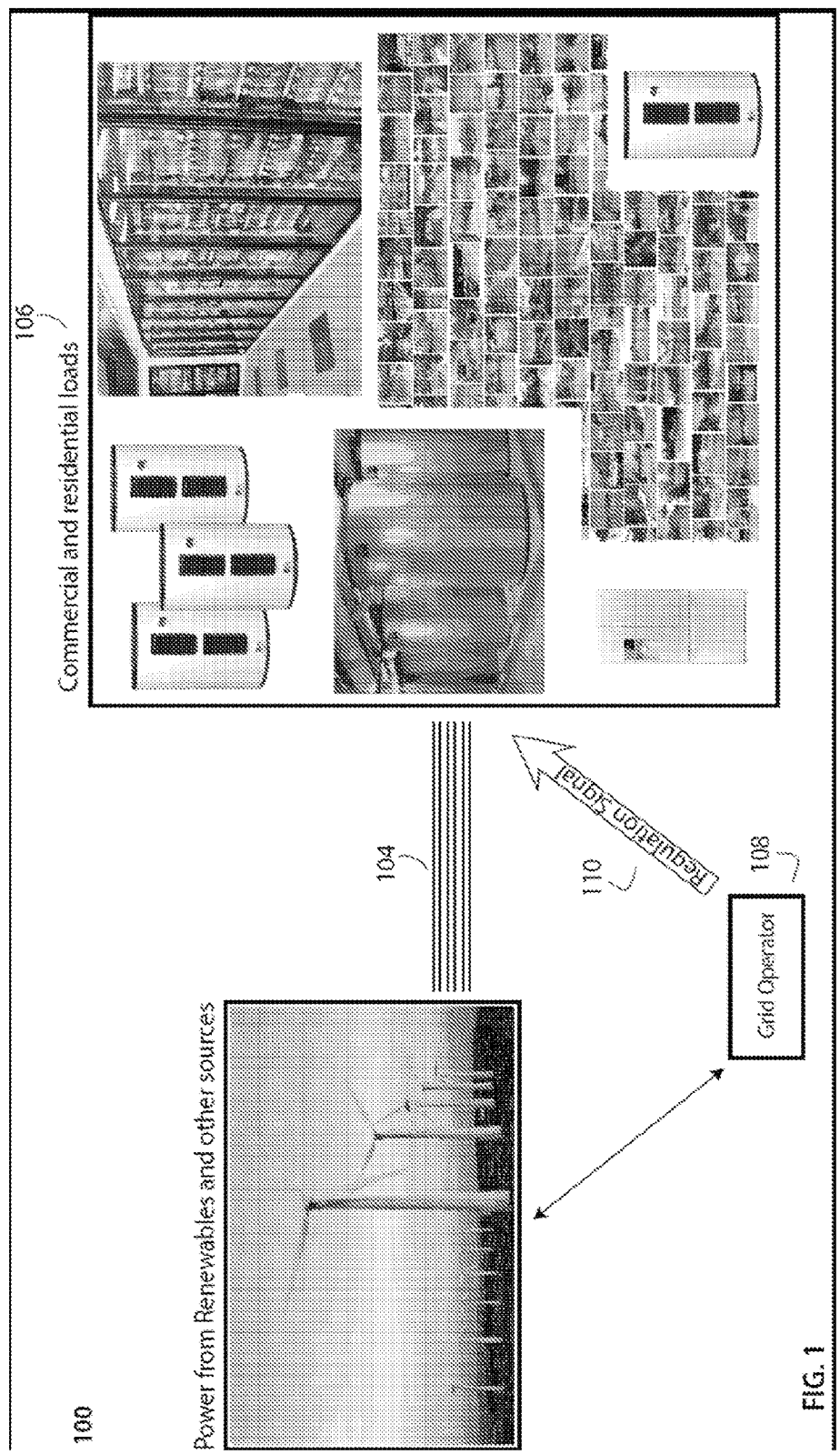
FIG. 1 is a schematic diagram of a power grid system in which some embodiments may be implemented.

In an electrical power grid, power generation and transmission are adjusted to compensate for a supply-demand imbalance due to fluctuating customer load and variations in some sources of supply. To maintain the balance of the supply and demand, ancillary services support a reliable operation of the grid as it moves electricity from generating sources to customers. Typical ancillary services procured by power grid operators (also referred to herein as balancing authorities) involve maintaining or restoring the power balance in the system over different time frames [15]. A frequency regulation service deployed to correct short-term fluctuations in load and generation is typically provided by generators which are ramped up and down to track a regulation signal sent by the grid operator that dictates changes in the generators' output.

Increased reliance on renewable generation introduces greater volatility and uncertainty in dynamics of a power grid and imposes additional regulation requirements on the grid [18, 19, 24]. The regulation requirements can be lowered if faster responding resources are available [17, 20]. These factors coupled with the search for cleaner sources of flexibility as well as regulatory developments, such as Federal Energy Regulatory Commission (FERC) order 755, have garnered a growing interest in tapping the fast response potential of storage and demand-side resources. In the absence of utility-scale storage alternatives, loads with virtual storage capabilities, such as heating and cooling loads, water pumps, and refrigerators are becoming popular choices to fulfill ancillary service requirements of the grid [21, 26]. Additionally, manufacturing companies and agriculture farms have been engaged by ramping up and down their energy use in response to the requirements of the grid [2, 12].

The flexibility potential of demand-side resources was recognized as a source for controlling thermal loads [25]. It has been proposed to use aggregated residential loads such as refrigerators, air conditioners, and water heaters for ancillary service provision [1, 6, 7, 11]. Also, pre-cooling of buildings to reduce peak load has been proposed [10, 27]. However, many of the currently implemented and suggested load control mechanisms are not practical for loads whose power consumption is not continuously variable.

The acronym PCC will be used henceforth to indicate the power consumption component (or load) that may adjust its power consumption to provide ancillary services to the grid.

The inventors have recognized and appreciated that many loads operate in discrete, finite states of power, such as in either an on state or an off state. By controlling many such loads—in the aggregate—to turn on or off in response to a regulation signal, demand may be adjusted to match supply far more closely at any time. Control in the aggregate may be achieved by having multiple loads, at numerous customer premises, respond in a probabalistic way to a regulation signal. A controller for each load may be programmed to respond to the regulation signal, probabalistically such that, in the aggregate, enough loads will be turned on or off at any time to match power consumption to available power supply far more closely. The inventors have recognized and appreciated that these load controllers may improve upon the limitations of batteries and flywheels, which have been used to try to compensate for changes in power generation and consumption: both batteries and flywheels are costly and large, and batteries have a finite lifetime.

The determination whether a specific load is to be turned on or off (or placed into some other state of the discrete, finite power states) may also be based on information about the operating state of the load. For example, the controllers may determine whether a load is to be on or off based on how long the load has been turned off or how long it has been on without having been turned off. Alternatively or additionally, the controllers may determine a next state of power for a load based in part on metrics associated with operation of the load. For example, if the load generates heat or provides cooling, a deviation from a desired temperature setpoint may be a state variable used in the determination of whether an individual load will be turned on or off. These or other metrics reflecting conditions at the premises where the load is operating may be used by a controller to apply constraints on the state of power for any individual load as determined by applying a probabilistic function. In some embodiments, a controller may receive information indicating the condition at the premises from sensors of other components that can measure or otherwise acquire the information. Accordingly, in some embodiments, adjustments to operating state of various loads may be made without affecting quality of service as experienced by a utility customer.

However, not all loads may be loads with discrete, finite states of power or on/off type loads. Some have continuously variable operating states and may be controlled using different algorithms to respond to a regulation signal.

Accordingly, a second portion of the demand-side regulation may come from adjusting continuously variable loads at customer premises, such as commercial buildings. These techniques may be used separately or together.

FIG. 1 shows an exemplary power grid system 100 in which some embodiments may be implemented. A group of power plants 102 connected to a power grid 104 may produce power and supply it to commercial and residential premises 106 via power grid 104, as schematically shown in FIG. 1. The power is transferred from generators at power plant 102 to loads at customer premises 106 through transmission lines, substations, transformers and other components forming power grid 104. It should be appreciated that power grid 104 typically comprises a large number of customers, such as customer premises 106, and is connected to multiple power plants and generators. It should also be appreciated that, though a single power plant 102 is shown in this example, power plant 102 may include multiple power plants connected to power grid 104.

FIG. 1 further shows a grid operator 108, which manages transmission of power via power grid 104 to customer loads at customer premises 106A-106C. Grid operator 108 may comprise, for example, a grid controller that controls operation of power grid 104. Grid operator 108 may be located outside power plant 102. It should be appreciated that embodiments are not limited to a particular location or implementation of grid operator 108.

To balance supply and demand in power grid 104, support transmission of power from sellers to purchasers to loads, and manage reliable operation of power grid 104, power grid 104 may utilize ancillary services, such as, for example, regulation ancillary services.

Conventionally, a power grid uses generators as regulation ancillary services. Thus, grid operator 108 may transmit a regulation signal to one or more generators (not shown) to ramp up and down their power output to compensate for fluctuations in power drawn from power grid 104.

In some embodiments, a grid operator controlling aggregated resources and loads in a power grid may generate a regulation signal that is associated with an ancillary service for the power grid. The regulation signal may be specific to the customer premises and may be generated by the grid operator based on parameters acquired from the customer premises, such as, for example, a capacity of facilities at customer premises for power regulation.

The grid operator (e.g., grid operator 108) may transmit the generated regulation signal to a customer premises to implement the ancillary service. In this way, the grid operator may control the operation of a power grid so that the grid receives ancillary services from multiple customer premises.

The regulation signal transmitted by the grid operator in accordance with some embodiments may be used to adjust load at the customer premises based on the fluctuations in supply and demand in the power grid. Grid operator 108 may determine an amount of load to be adjusted in power grid 104 and may allocate to each of multiple facilities at the customer premises an adjustment in power consumption to achieve a load adjustment based on the determined amount. Grid operator 108 may generate and transmit in a suitable manner to each of the facilities at customer premises 106 the regulation signal indicating the adjustment in power consumption allocated to that facility. In accordance with some embodiments, the same regulation signal may be broadcasted to multiple customer premises. That regulation signal may be combined with other information to determine whether to change the state of power of a load or loads at each of customer premises. Such an approach enables the energy usage in the aggregate to track the regulation signal, while providing little impact on quality of service as perceived by individual users.

However, in some embodiments, one regulation signal may be provided to each of multiple customer premises for regulation of all loads in that premises or all loads of a particular type. For example, in some embodiments, regulation signals may have limited frequency bandwidth, and may be used to control loads that are suitable for being controlled to alter their power consumption at a frequency corresponding to the frequencies in the regulation signal. In embodiments in which a single regulation signal is supplied to multiple premises, each controller may make a determination, based on a probability function or other suitable criteria, whether, in response to the regulation, its corresponding load should be modified.

In the example illustrated, customer premises 106 may provide ancillary services to power grid 104. Accordingly, to control the operation of power grid 104 using the ancillary services, grid operator 108 may provide a regulation signal 110 to customer premises 106. Each facility at the customer premises 106 (e.g., one or more commercial buildings) may have a different capability in adjusting its power consumption as part of providing the ancillary services. Thus, grid operator 108 may determine an amount of the adjustment in power consumption allocated to the facility based on the amount of load to be adjusted in power grid 104 and the capability of that facility.

In some embodiments, grid operator 108 may transmit regulation signal 110 to one or more facilities at customer premises 106 to control operating parameters of one or more PCCs at the facility. The facility that receives regulation signal 110 may be one or more commercial buildings and/or residences, each having at least one PCC. The commercial building may have a capability to modify at least one operating parameter of the PCC so that power consumption by that component is changed in accordance with regulation signal 110.

In some embodiments, grid operator 108 may utilize ancillary services on power grid 104 to correct some or all of the deviations from the balance in supply and demand within seconds or minutes or hours. Thus, the regulation signal may have primary frequency components indicative of changes in power consumption over a time in a range from 1 minute to 5 minutes, 5 minutes to 10 minutes, 10 minutes to 1 hour, or in any other suitable ranges.

In some embodiments, grid operator 108 may control the operation of power grid 104 to measure in real time an imbalance between power generated on power grid 104 and load on the power grid. To compensate for the imbalance using the ancillary services provided by the customer premises, grid operator 108 may transmit, in real time, a regulation signal to the customer premises (e.g., regulation signal 110 to customer premises 106 in FIG. 1) indicating an allocated amount of the adjustment in power consumption by the customer premises.

Some embodiments provide techniques for providing ancillary services to a power grid using a customer premises. A suitable component at the customer premises may implement the ancillary services in accordance with the techniques described herein.

Figure 2:
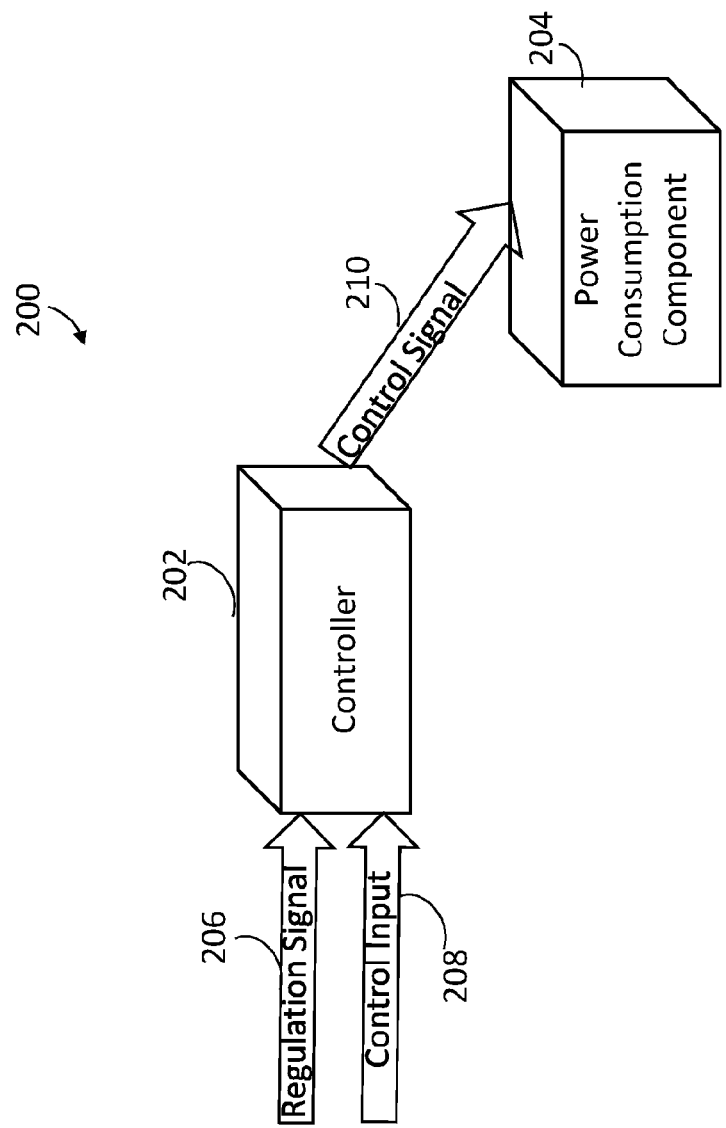
FIG. 2 is a schematic diagram of a control system providing ancillary services to a power grid, in accordance with some embodiments.

FIG. 2 illustrates schematically an example of a control system 200 at a customer premises that provides ancillary services to a power grid, in accordance with some embodiments. Customer premises may be, for example, customer premises 106A (FIG. 1), or any other suitable customer premises having facilities comprising PCCs. The customer premises may be, for example, residential or commercial buildings comprising one or more PCCs which can be set to one of multiple discrete, finite states of power, or turned on or off to adjust their power consumption, based on a regulation signal received from a grid operator.

In some embodiments, a suitable component at the customer premises, such as a controller 202 in FIG. 2, may be used to control power consumption by one or more PCCs, such as a PCC 204, to provide ancillary services to the power grid.

Controller 202 may be implemented in any suitable manner. For example, in some embodiments, controller 202 may comprise a thermostat adapted to control at least a portion of the HVAC system. In such embodiments, controller 202 may comprise a housing having terminals for wires connected to a controller for a portion of a Heating, Ventilation, and Air Conditioning (HVAC) system. However, it should be appreciated that controller 202 may be any suitable apparatus having any suitable circuitry for implementing functions as described herein, as embodiments of the invention are not limited in this respect. For example, controller 202 may be a controller for a pool pump or other load with discrete, finite states of power or on/off load. It should be appreciated that, though a single controller is shown controlling a single load, there may be multiple controllers and/or multiple loads. In some embodiments, one controller may control multiple loads. In such an embodiment, the controller may be programmed to perform different operations for different loads or different types of loads.

As shown in FIG. 2, controller 202 may receive a regulation signal 206 (e.g., regulation signal 110 shown in FIG. 1). Regulation signal 206 may be used to indicate a change to compensate for a mismatch between load in the power grid and power generation capacity in the power grid.

In some embodiments, controller 202 may, based on the received regulation signal 206, modify at least one operating parameter of PCC 204 so that power consumption by PCC 204 is changed in accordance with the regulation signal 206. Regulation signal 206 may be associated with an ancillary service for the power grid and may indicate a change in power consumption at the customer premises—e.g., a change in power consumption by PCC 204—to implement the ancillary service.

In FIG. 2, in addition to regulation signal 206, controller 202 may also receive control input 208, which may indicate an operating state of PCC 204. In some embodiments, control input 208 may be derived, at least partially, from a user input specifying an operation of PCC 204. In other embodiments, control input 208 may be generated automatically, in a suitable manner. Alternatively or additionally, in some embodiments, control input 208 may represent an operating state of the load. That operating state may include length of time since the associated load was off, the amount of time it has been on, and/or parameters affected by operation of the load, such as a temperature of an environment that is heated or cooled when the load operates. It should be appreciated that, though FIG. 2 illustrates such a control input 208 being applied to controller 202, some or all the elements of control input 208 may be calculated by a processor, stored in memory or otherwise determined within controller 202.

Controller 202 may, based on received regulation signal 206 and control input 208, control power consumption by PCC 204 to provide the ancillary services to the power grid. In particular, controller 202 may modify at least one operating parameter of PCC 204 by computing the at least one operating parameter based on regulation signal 206 and control input 208. In the example illustrated, controller 202 may thus generate a control signal 210 for PCC 204, where control signal 210 may control PCC 204 based on the computed operating parameter.

Exemplary Demand Dispatch System for Loads with Discrete, Finite States of Power As described in "Barooah and Meyn", U.S. patent application Ser. No. 14/120,367, entitled "USING CUSTOMER PREMISES TO PROVIDE ANCILLARY SERVICES FOR A POWER GRID," filed May 14, 2014, flexible loads whose power consumption can be adjusted continuously may provide significant ancillary services. However, there are a limited number of such loads, and hence significant ancillary services can be obtained from loads that have only a finite number of discrete states of power (e.g., on/off, or high/medium/low/off). Moreover, variable speed drive devices and other continuously variable loads may not be well suited to low frequency ancillary service. Thus, other portions of the demand dispatch, which may be determined by filtering the regulation signal, may be provided by control of loads with discrete, finite states of power or on/off loads. Such control may be provided instead of or in addition to control of continuously variable loads.

Figure 3:
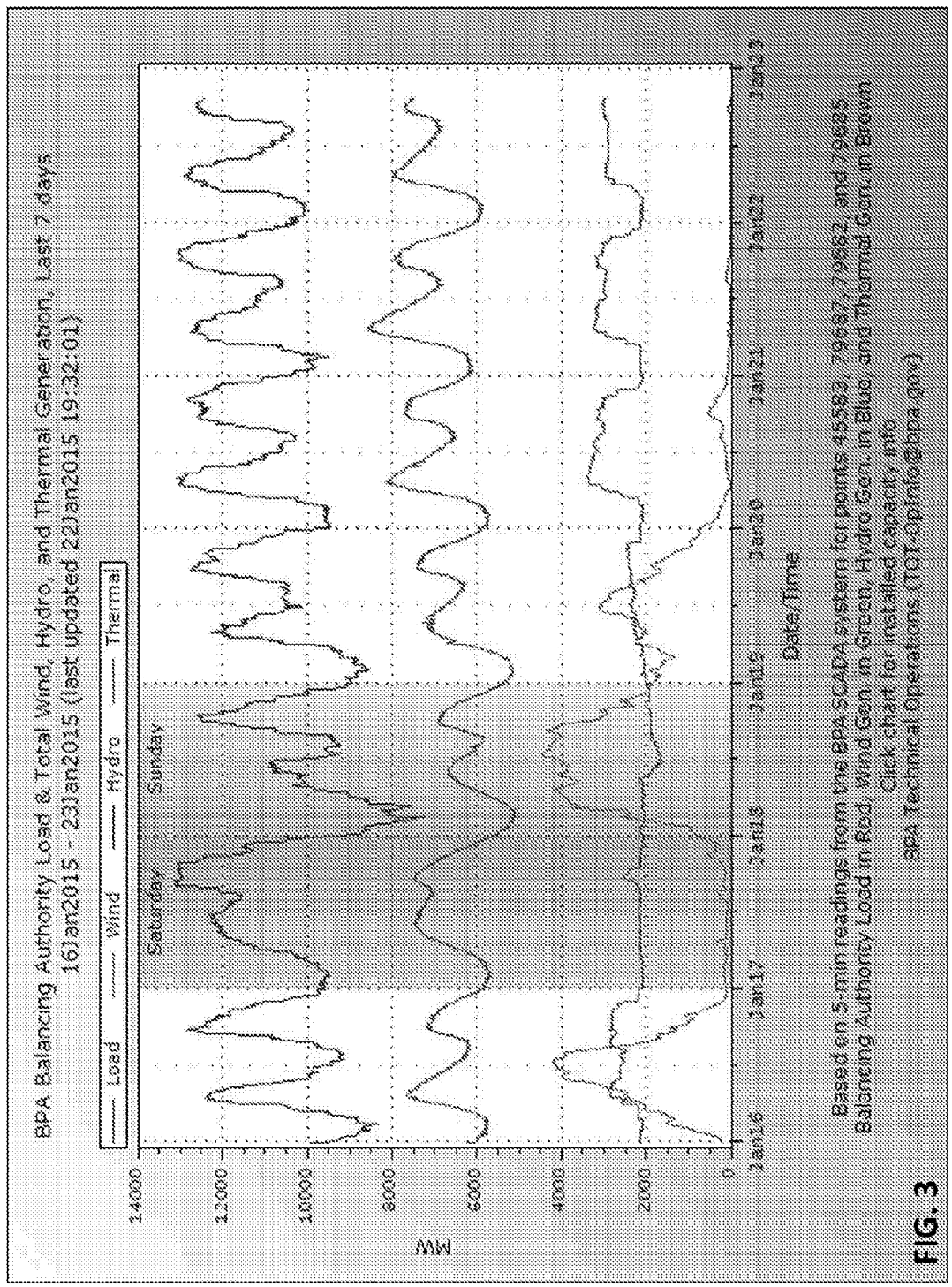
FIG. 3 is a chart illustrating exemplary deviations in power generation and power consumption.
Figure 9:
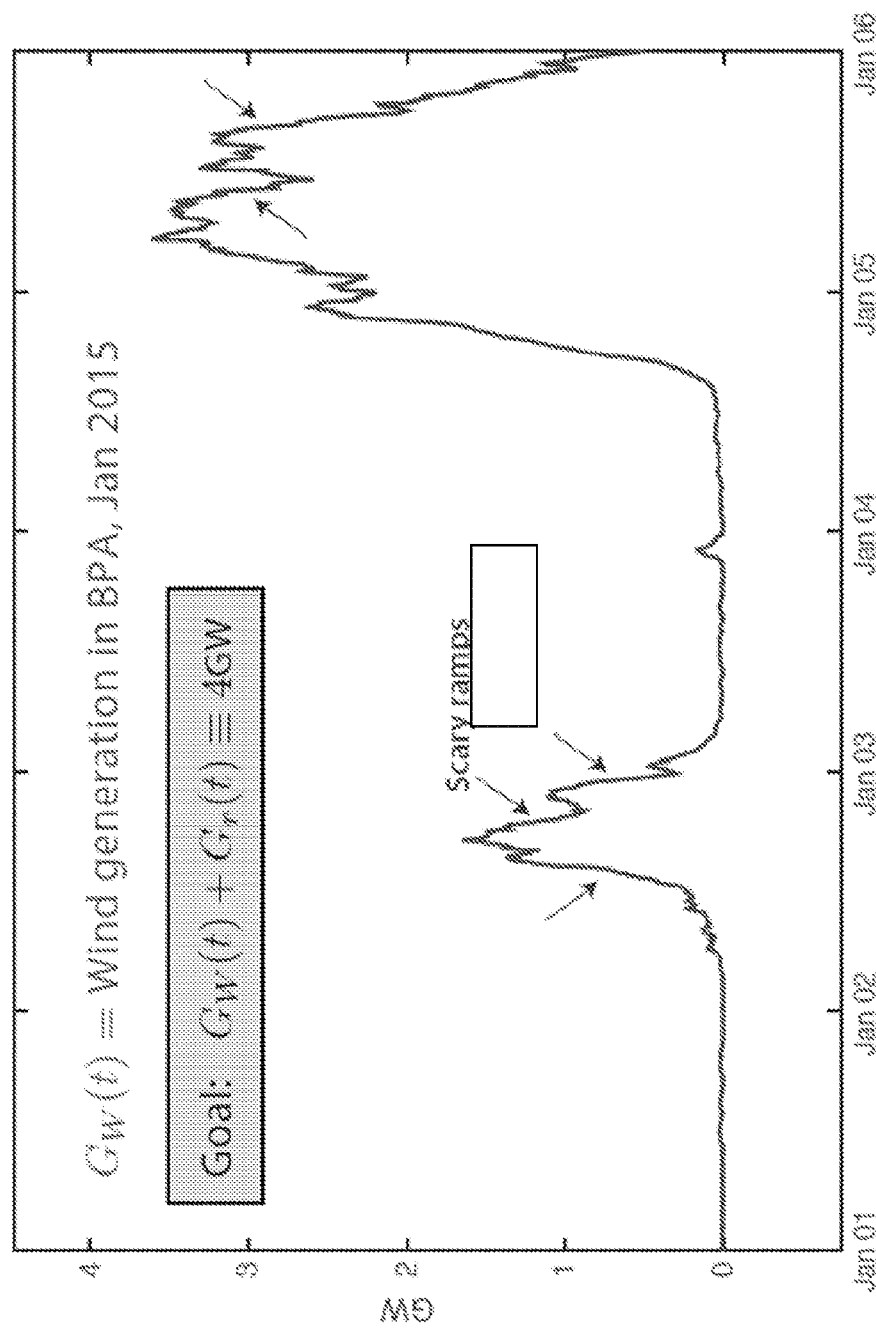
FIG. 9 is a chart illustrating an example of undesirable ramps in wind power generation.

For example, the Bonneville Power Authority (BPA) oversees regulation of the sector of the power grid in the Northwestern United States. A typical week from their website is shown in FIG. 3. The inventors have recognized and appreciated that a challenge faced by this and many other balancing authorities and illustrated in FIG. 3 is that the power from renewable energy sources like wind and solar power may ramp down by one gigawatt in just one hour. This is equivalent to the sudden shutdown of a nuclear power plant. Both the downward and upward ramps present a serious challenge today. FIG. 9 illustrates another example of undesirable ramps in wind generation. This figure illustrates the benefits of supplementing wind generation to meet a 4GW load. However, the inventors have recognized that decreasing load by some or all of the needed supplemental amount may achieve the same benefit.

The inventors have recognized and appreciated that, although the low frequency variation in power may be addressed by slowly increasing or decreasing the power output from generators in the region—the main source of power in the BPA region being hydro-generation—most generators are more efficient when their output is maintained at a constant value. Moreover, high frequency ramps are the main challenge there and in other regions of the world, as such high frequency changes in power generation create a supply-demand imbalance that is inefficient and prevents demand from always being satisfied. Such high frequency ramps can be caused also by time-specific peaks in power consumption and/or disturbances to the grid caused by unexpected generator outages. As discussed above, batteries and flywheels have been used to try to compensate for these high frequency changes in power generation (and consumption), but batteries are costly, large, and have a finite lifetime, and flywheels have very limited capacity.

The inventors have recognized and appreciated that power generation and consumption variations in various frequency ranges (from minutes to hours) and the problems stemming from conventional solutions may be addressed using a demand dispatch system with a decision system at each of multiple, flexible loads. Advantages of such a system include precise, responsive, and reliable control of power consumption (at least as responsive and reliable as batteries and flywheels, and more so than generators), with predictability and availability every day despite variability over time. Advantages also include the ability to vary aggregate power consumption continuously. Advantages further include the ability to rely more heavily on "volatile" power generation sources like wind and solar power without adversely impacting the quality of service to the customers, due at least in part to the decision system at each load. Moreover, advantages include cost-effectiveness with potentially no marginal cost, even considering communication costs, maintenance costs, and environmental costs.

Figure 4:
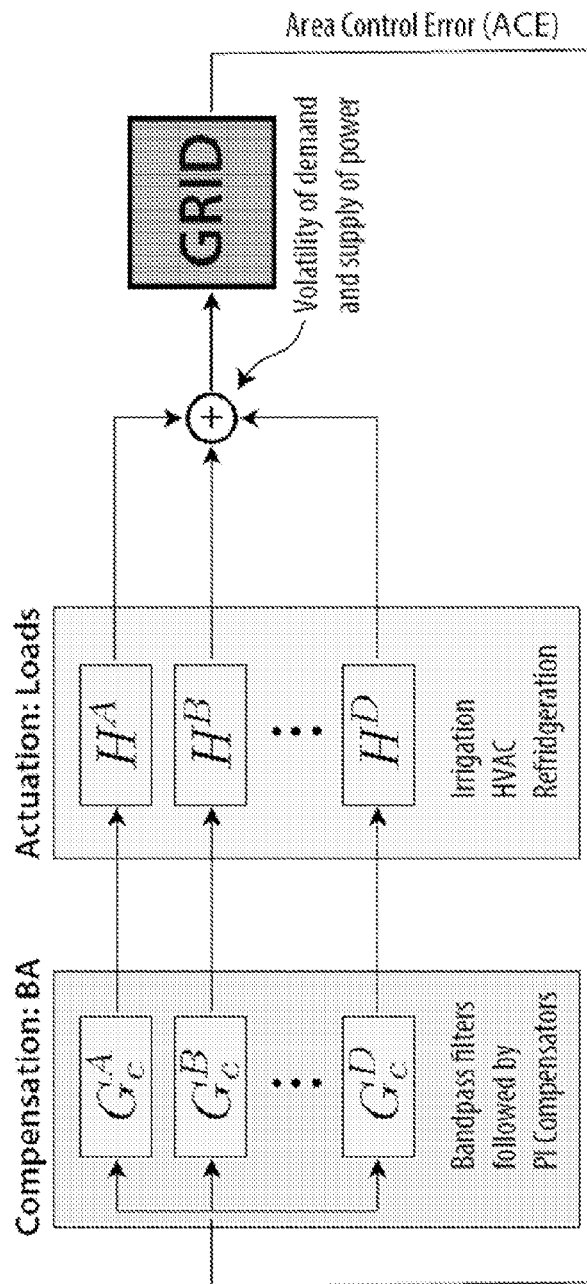
FIG. 4 is a schematic diagram of a typical grid with actuation at a high level.
Figure 8B:
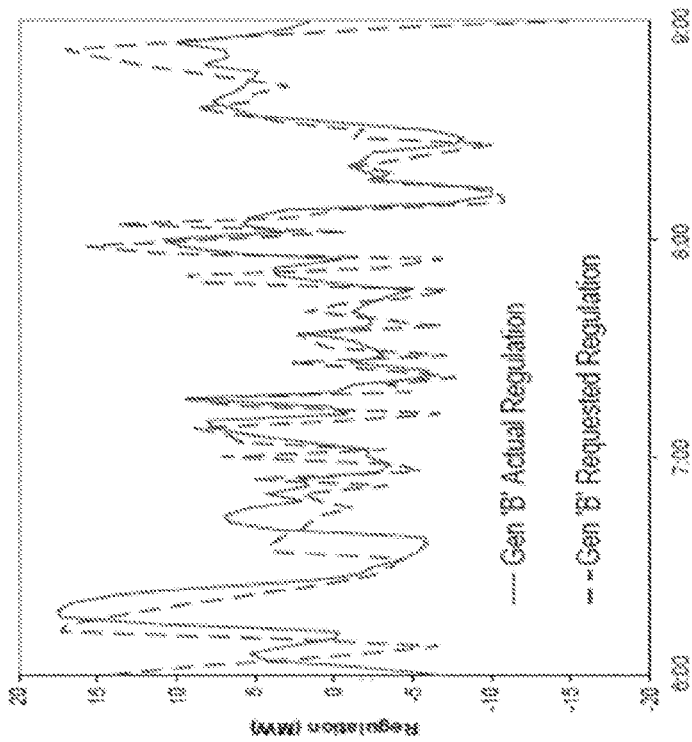
FIGS. 8A and 8B are charts illustrating coal-fired generators tracking regulation signals.
Figure 8A:
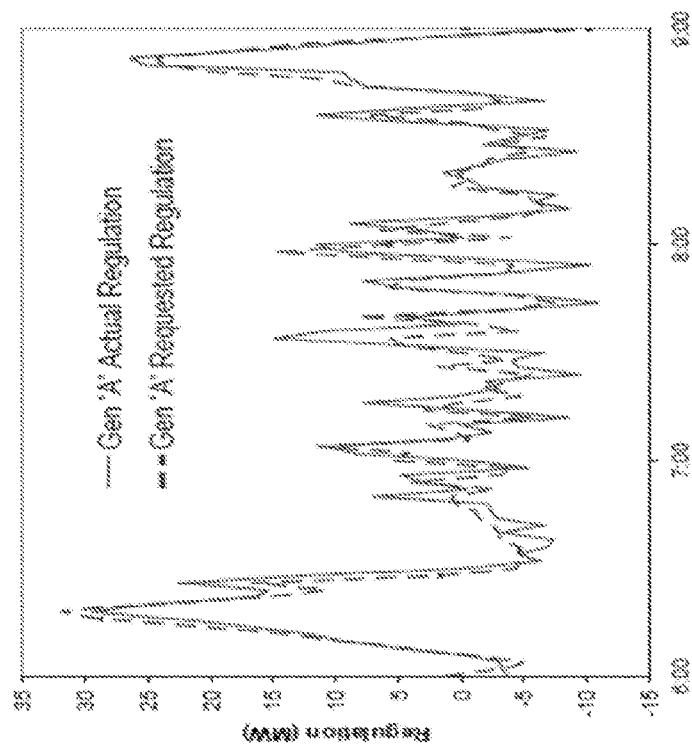

FIG. 4 illustrates an example of a typical grid with actuation at a high level. The BA transmits a control signal to a class of resources that varies power consumption up and down, much like the ailerons on the wings of an airplane regulate flight. The collection of similar loads shown in FIG. 4 (titled Actuation: Loads) is traditionally provided by manipulating the output of large generators. For example, FIGS. 8A and 8B illustrate the attempts of coal-fired generators to track regulation signals, which clearly leave room for improvement. [41] The inventors have recognized and appreciated that actuation may be provided more accurately and more cheaply by manipulating the power consumption of multiple loads (instead of or in addition to manipulating the power generation of generators like gas-turbine and hydroelectric generators).

Figure 5:
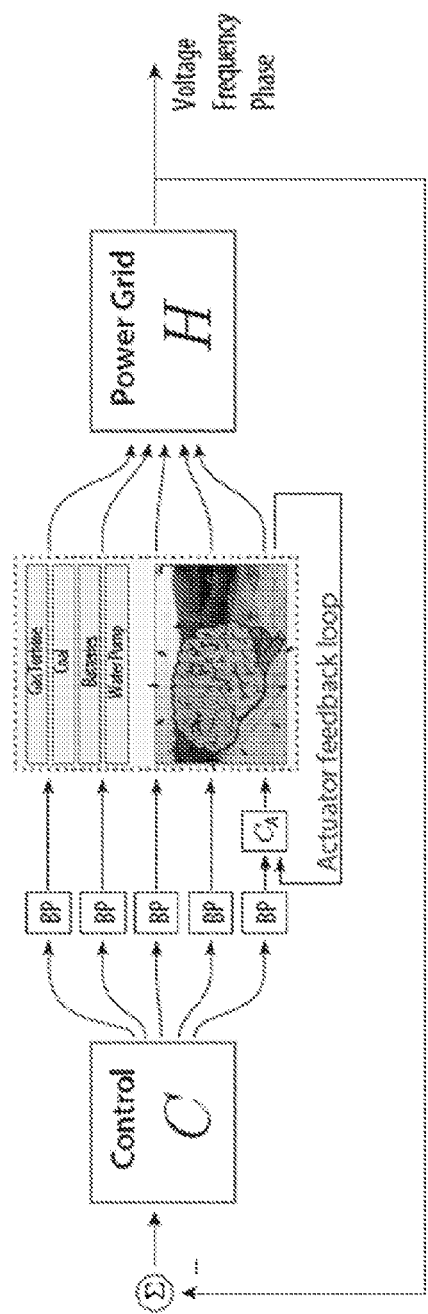
FIG. 5 is a schematic diagram of a demand dispatch system collecting aggregate power consumption data from a group of loads and modifying the regulation signal sent to these loads based on this and other information, such as wind generation forecast error and load forecast error.

The inventors have recognized and appreciated that improvements may be possible also using a random number generator as part of a decision process made by a load (resulting in a load being "intelligent" as shown in FIG. 5) without requiring a balancing authority to have precise estimates of states of the load or the corresponding complexity, unlike in previous systems such as [40]. Previously, randomization has been used in communication networks to prevent synchronization of behavior at each node in the network [31]. The inventors have also recognized and appreciated that a randomized demand dispatch control strategy can maintain privacy for the owners and users of premises, especially when the controlled components are parts of private facilities like pools.

Figure 10A:
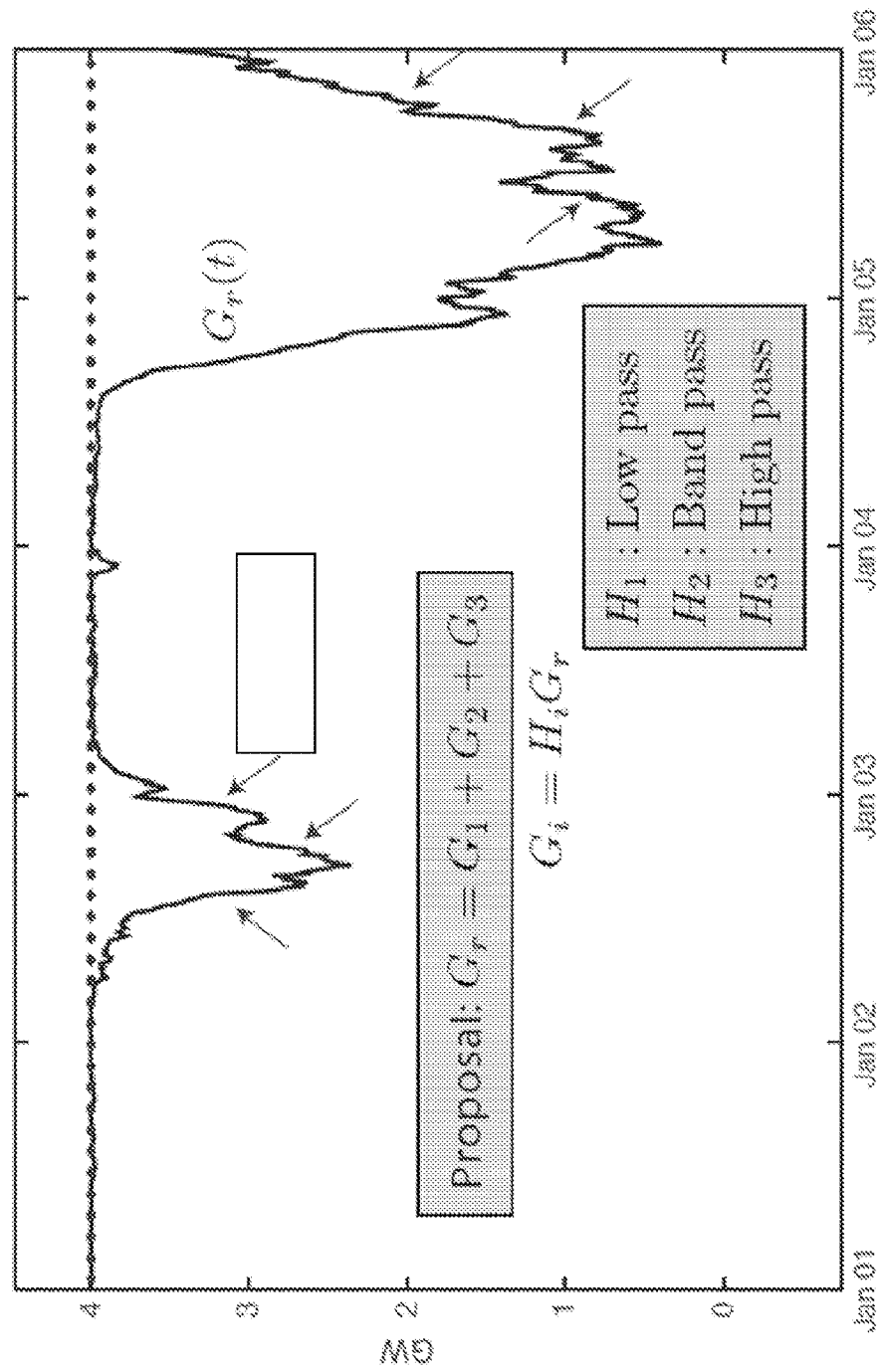
FIGS. 10A and 10B are charts illustrating a combination of loads and resources that may produce a desired deviation according to some embodiments.
Figure 10B:
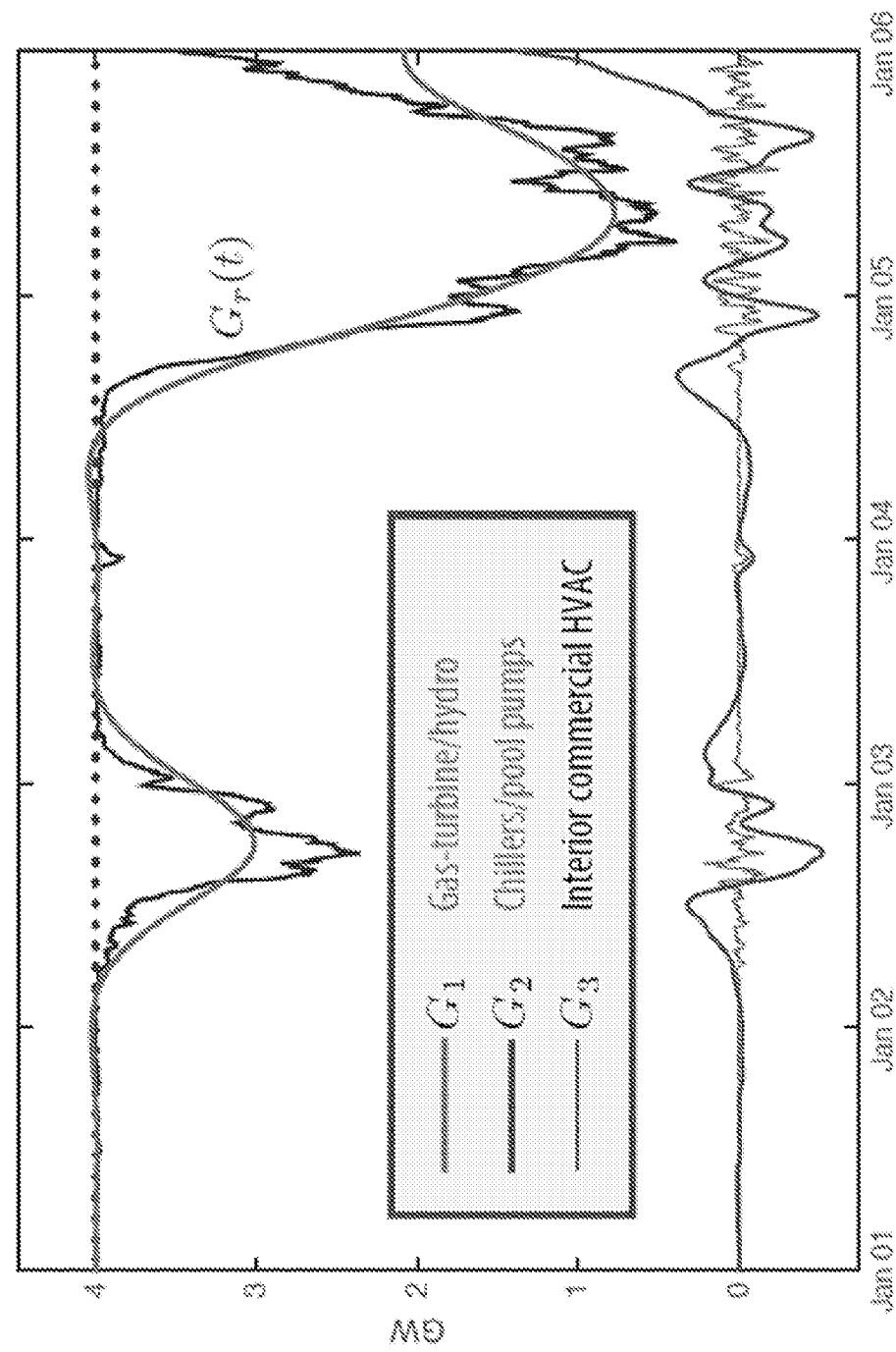
Figure 11:
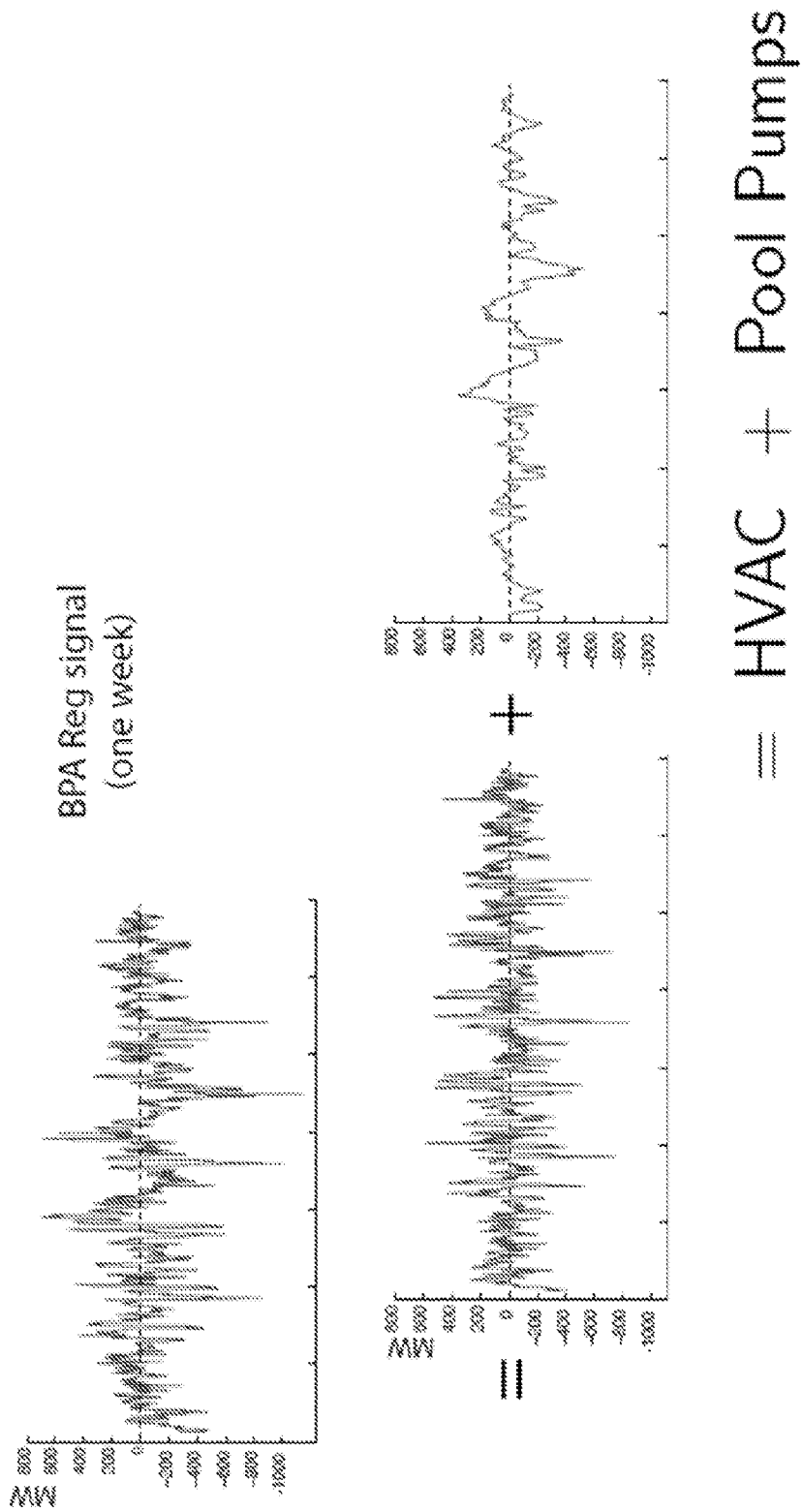
FIG. 11 is a collection of charts illustrating a combination of loads that may track a regulation signal according to some embodiments.

The inventors have further recognized and appreciated that using a single load or resource to provide ancillary services to balance the undesirable ramps of power generation may require similarly undesirable ramps in power consumption by the load. In contrast, using multiple loads or resources in combination may provide the desired ancillary services without any of the loads or resources individually having undesirable ramps in power consumption or generation. FIGS. 10A and 10B illustrate using multiple loads or resources in combination according to some embodiments—in this example, the loads include chillers or pool pumps and interior commercial HVAC systems and the resources include gas-turbine or hydroelectric generators. Control techniques as described herein may be used with HVAC that operate in a finite number of power states or with any other load of similarly characteristics, such as fridges or other residential TCLs. FIG. 11 illustrates how HVAC systems and pool pumps in combination can track a regulation signal according to some embodiments. Another example of a load is a chiller of a commercial HVAC system that maintains cold water for both cooling and humidity regulation. Such a load may have a finite number of discrete states of power such that it is not continuously variable.

According to some embodiments, communication from a grid operator to each load may be one-way. Additionally, the loads may have discrete, finite states of power or be either on or off rather than having continuously variable consumption. Moreover, the loads may be deferrable, such that power to the loads may be varied without serious or sometimes even noticeable disruption to the customer. For example, a pool pump may be a deferrable load, while a computer, television, or data center may not be deferrable, depending on the customer and use case.

According to some embodiments, a customer may receive an incentive payment for participating in the demand dispatch system, which may be reliable and explained to the customer. For example, the customer may receive a fixed yearly payment for participation, and an additional monthly payment for the amount of flexibility offered to the grid. In this way the customer receives a clear explanation of the payment each month.

In some embodiments, each load may include a microcontroller (for example, one or more processors) that may be programmed with a control function that may be programmed for the type of load. Such programming may determine, for each load that might otherwise be turned on, whether that load should be turned on or off so as to provide in the aggregate a desired impact on power consumption. In some embodiments, each controller may be programmed with limits such that even when, probabilistically, it is determined the load should be off, the load may be powered on. The microcontroller may have computational power as low as a simple calculator, such as one commonly found in the 1970s. The low requirements of the microcontroller enhance the affordability and efficiency of the demand dispatch system and the individual components of the system.

A control function for a load may be defined by a family of Markov transition matrices, denoted $\{P_\zeta : \zeta \varepsilon \zeta\}$. For each scalar $\zeta$, the matrix may be a square matrix. Each row of the square matrix may be a probability mass function (pmf) on a finite number of states $X=\{x^1, \ldots, x^d\}$. These matrices may be stored in memory in the microcontroller at each load. In some embodiments, each load may have an on or an off state, or a finite number of discrete power-level states. The state space X may include power-level states, and sub-states such as the current water temperature in the case of a chiller, or the length of time the load has been in the current power-level state.

According to some embodiments, at time t, if a load receives the signal $\zeta_t$ from the grid operator, and its current state is x, then it changes state to the value x' with probability defined by the transition matrix, $P_t(x,x')$, where the subscript t indicates the transition matrix obtained with $\zeta_t$.

The inventors have recognized and appreciated that it would be desirable to the grid operator for a collection of similar loads to behave like an ideal wire—without resistance or delay—but that this is not possible because all physical systems have temporal dynamics. In engineering and in physics, the following approximation to this idealization is called passivity:

Letting $\{\zeta_t: t \geq 0\}$ denote the signal sent to a collection of loads, and letting $\{y_t: t \geq 0\}$ denote the aggregate deviation in power consumption of the loads, the input-output behavior may be called passive if for any such input-output pair, $$\sum_{t=1}^{\infty} \zeta_{t-1} y_t \geq 0$$

The one-step delay in the input (the subscript t−1) is due to inherent delay in the system.

The inventors have recognized and appreciated that placing the decision system at the load with design according to some embodiments can make the aggregate power consumption behave like a single passive system.

Exemplary Design Procedure for Transition Matrices

According to some embodiments, the design of the decision system may be as follows, which may include elements in common with the System Perspective Design described below.

The following notation may be used:

$\mathbb{R}$: real numbers $\mathbb{C}$: complex numbers

The state space may be denoted $X=\{x^1, \ldots, x^d\}$. A transition matrix P may be either a d×d matrix, or a real-valued function on X×X: We have $P(x,x') \geq 0$ for each $x,x' \in X$, and $\Sigma_{x'} P(x,x')=1$ for each $x \in X$.

A pmf $\pi$ is invariant for P if for each state $x' \in X$, $$\pi(x') = \sum_{x \in X} \pi(x) P(x, x')$$

Interpreted as a row vector, invariance can be expressed $\pi P = \pi$.

If P is a transition matrix with invariant pmf $\pi$, then the fundamental matrix [29] may be defined as the inverse, $$Z = [I - P + 1 \otimes \pi]^{-1} \quad (1)$$

where $1 \otimes \pi$ is a matrix in which each row is identical, and equal to $\pi$. If P is "uni-chain" and aperiodic, then it can be expressed as a power series:

$$Z = \sum_{n=0}^{\infty} [P - 1 \otimes \pi]^n$$

with $[P-1 \otimes \pi]^0 := I$ (the d×d identity matrix).

If P is a transition matrix with invariant pmf wt, then we denote, for any pair of states $x,x' \in X$, $$P^\dagger(x, x') = \frac{\pi(x')}{\pi(x)} P(x', x) \quad (2)$$

This is known as the adjoint of P. The adjoint $P^\dagger$ is a transition matrix with invariant pmf $\pi$.

Each technique to design a family of transition matrices may be defined by a function $\mathcal{U}$ of the state that models power consumption: $\zeta(x)$ may be the power consumption when the load is in state x.

The family of transition matrices that is constructed using one of the methods described in this section is by design of the following form:

$$P_\zeta(x,x') = P_0(x,x')\exp(h_\zeta(x,x') - \Lambda_\zeta(x)), \quad x,x' \in X, \zeta \in \mathbb{R} \quad (3)$$

The function $h_\zeta$ may take on positive or negative values. Once this is specified, the function $\Lambda_\zeta$ may be uniquely defined so that $P_\zeta$ is a transition matrix: For each x and $\zeta$, $$\Lambda_\zeta(x) = \log\left(\sum_{x' \in X} P_0(x,x')\exp(h_\zeta(x,x'))\right)$$

In these equations, "exp" represents the exponential, and "log" is the natural logarithm.

The construction of the family of functions $\{h_\zeta : \zeta \in \mathbb{R}\}$ that define the transition matrices $\{P_\zeta : \zeta \in \mathbb{R}\}$ may be achieved using the following process.

Act 1: This consists of two design choices:

(a). A Markovian model for the load may be created based on its typical operating behavior. For example, a water chiller turns on or off depending upon the temperature of the water. This behavior may be described by a Markov chain with transition matrix $P_0$.

(b). The specification of a function H that takes as input a transition matrix P. The output H=H(P) is a real-valued function on the product space X×X. That is, $H(x,x') \in \mathbb{R}$ for each pair $(x,x') \in X \times X$.

Act 2: The family of transition matrices $\{P_\zeta\}$ and functions $\{h_\zeta\}$ are defined by the solution to the d-dimensional ordinary differential equation:

$$\frac{d}{d\zeta}h_\zeta = H(P_\zeta), \quad \zeta \in \mathbb{R}, \quad (4)$$

in which $P_\zeta$ may be determined by $h_\zeta$ through (3). The boundary condition for this ODE is $h_0 = 0$.

Act 1(a) may have additional design constraints. For example, in many applications it is important to include a model of randomness from nature along with the randomness introduced by the local control algorithm.

Consider a load model in which the full state space is the Cartesian product of two finite state spaces: $X = X_u \times X_n$, where $X_u$ are components of the state that can be directly manipulated through control. The "nature" components $X_n$ are not subject to direct control. For example, these components may be used to model the impact of the weather on the climate of a building, or the temperature of water in a water heater.

Elements of X may be denoted $x = (x_u, x_n)$. Any state transition matrix under consideration may be assumed to have the following conditional-independence structure, $$P(x,x') = R(x,x_{u'})Q_0(x,x_{n'}), \quad x \in X, x_u \in X_u, x_n \in X_n \quad (5)$$

where for each x, $$\sum_{x_{u'}} R(x,x_{u'}) = \sum_{x_{n'}} Q_0(x,x_{n'}) = 1$$

The matrix $Q_0$ is out of our control, modelling dynamics such as the weather.

The form (3) for $P_\zeta$ may be maintained, as may be the acts to design $h_\zeta$. To ensure that $P_\zeta$ is of the form (5), it may be necessary and sufficient to restrict to functions $h_\zeta$ of $(x,x')$ that do not depend on $x_{n'}$, where $x' = (x_{u'}, x_{n'}) \in X$. For this reason we make the notational convention, $$h_\zeta(x,x') = h_\zeta(x,x_{u'}), \quad x \in X, \; x' = (x_{u'}, x_{n'}) \in X$$

Since $h_\zeta$ may be constructed through the ODE (4), we may impose the same constraints on H=H(P):

$$H(x,x') = H(x,x_{u'}), \quad x \in X, \; x' = (x_{u'}, x_{n'}) \in X$$

Given any function $G: X \to \mathbb{R}$, the function defined below satisfies this constraint:

$$H(x,x_{u'}) = \sum_{x_{n'}} Q_0(x,x_{n'})G(x_{u'},x_{n'}), \quad x \in X, x' = (x_{u'}, x_{n'}) \in X \quad (6)$$

The methods that follow may construct H=H(P) of this form.

In the special case in which randomness from nature is not considered, we can apply the methods described here using $X_n = \{n_1\}$ (a singleton). In this case $H(x,x_{u'}) = G(x_{u'})$ for all x and $x_{u'}$, and the method will generate a family of functions $\{h_\zeta(x,x')\}$ that do not depend on the first variable x.

The methods below may use variations of the fundamental matrix and each may rely on the function that represents power consumption.

There are many variations possible to take into account specific characteristics of the load. For example, notwithstanding a new state projected by a model, if placing a load in that state would damage a load or preclude the load from providing its intended function, the controller may select the next operating state according to criteria that override the model. For example, a controller for a pool pump may ensure that the pool pump operates for at least 4 hours after it is turned on or does not changes its state more than 4 times per day. Conversely, criteria associated with a load may alternatively alter the probabilistic function used to determine whether a particular load is on or off (or some other of multiple discrete, finite states of power) based on the operating state of the load. For example, if criteria indicate that a load can be off for up to 30 minutes per 4 hour window, the controller may select a control algorithm that increases the likelihood that a specific load will be selected after the load has been continuously on for 4 hours.

Individual Perspective

The function G may be defined in terms of the fundamental matrix as follows:

$$G(x') = \sum_x Z(x',x)\zeta(x), \quad x' \in X \quad (7)$$

This is called the Individual Perspective Design (IPD), as it is inspired by an optimization problem formulated from the point of view of a single load.

System Perspective

The motivation of the following System Perspective Design (SPD) is from the point of view of the grid operator. Under general conditions, the linearized aggregate model may be passive, which, as noted earlier, is a desirable property from the grid-level perspective.

The construction of G is similar to IPD. For any matrix P with invariant pmf wt, recall the definition of the adjoint in (2):

$$P^\dagger(x,x') = \frac{\pi(x')}{\pi(x)}P(x',x)$$

The matrix product $P^\nabla = P^\dagger P$ may be defined as follows: For any pair of states $x,x' \in X$, $$P^{\nabla}(x, x') = \sum_{z \in X} P^{\eta}(x, z) P(z, x')$$

The fundamental matrix defined in terms of this transition matrix may be denoted, $$Z^{\nabla} = [I - P^{\nabla} + 1 \otimes \pi]^{-1} \qquad (8)$$

We then take, $$G(x') = \Sigma_x Z^{\nabla}(x', x) \zeta(x), \ x' \in X \qquad (9)$$

Compromise Perspective

A parameter $\beta \in (0,1)$ represents the compromise between the two perspectives. Letting $\{P_\zeta^{IPD}\}$ and $\{P_\zeta^{IPD}\}$ denote the family of transition matrices obtained using the two previous design methods, we define the Compromise Perspective Design (CPD) as the convex combination, $$P_\zeta^{CPD} = \beta P_\zeta^{IPD} + (1-\beta) P_\zeta^{IPD}$$

Figure 6:
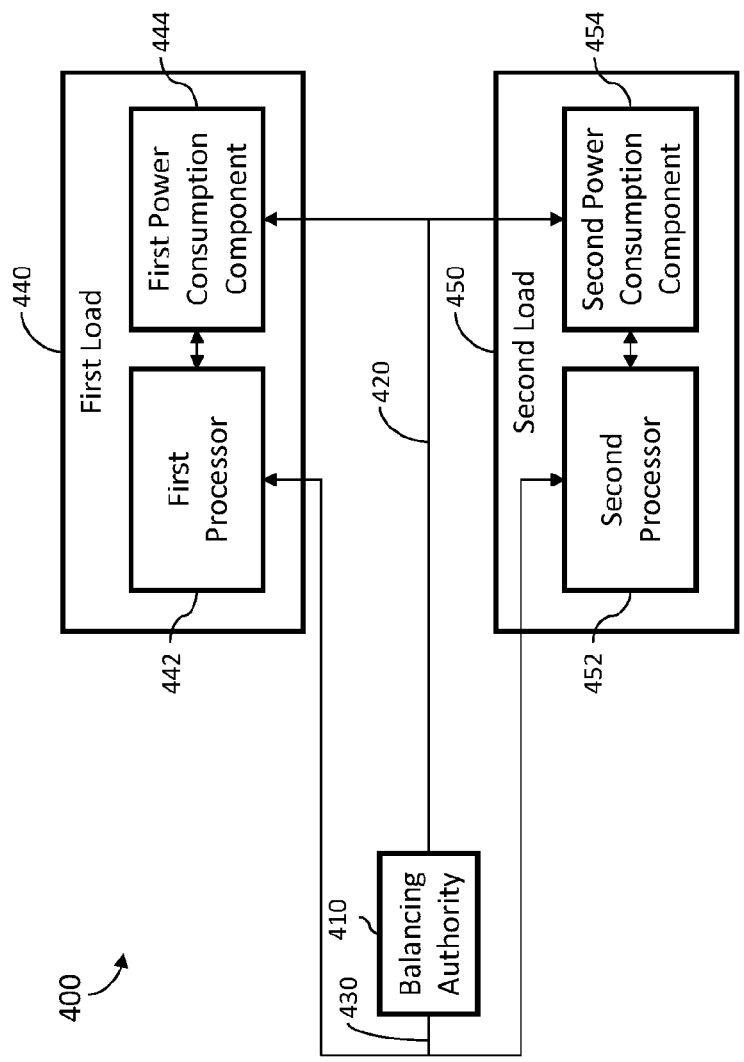
FIG. 6 is a schematic diagram of an exemplary system for providing ancillary services to a power grid according to some embodiments.

Exemplary Implementation of a Demand Dispatch System for Loads with Discrete, Finite States of Power FIG. 6 illustrates an exemplary system 400 for providing ancillary services to a power grid using, in tandem, control of several devices at a customer premises. In this example, two loads 440 and 450 are illustrated. These loads may be located at the same consumer premises. One or more of these loads may be operable in one of a finite number of discrete power states, and may be controlled as described herein. Other loads may be controlled in the same or different ways. The system 400 may include a balancing authority 410 connected to a power grid 420. According to some embodiments, the balancing authority 410 may transmit a regulation signal 430 associated with an ancillary service for the power grid 420. The system 400 may also include a first load 440 and a second load 450. It should be appreciated that only two loads are shown for simplicity of illustration, but a power distribution system may have many more than two loads.

According to some embodiments, the first load 440 may include a first processor 442 and a first PCC 444, and the second load 450 may include a second processor 452 and a second PCC 454. These processors may be embedded in controllers for the loads. For example, if the load is a pool, the processor may be a processor in the pool pump controller. It should be appreciated that a load in an off state may not necessarily mean that a controller or processor associated with the load is also in an off state. A controller or processor may remain on in order to receive the regulation signal 430 and/or control the PCC of the load (or, as sometimes described herein, control the load itself) based on the regulation signal 430 or any other suitable factor.

According to some embodiments, the first processor 442 and the second processor 452 may be a single processor configured to manage both the first load 440 and the second load 450. Additionally, the first load 440 and the second load 450 may include multiple other loads, as embodiments are not limited to two or any other number of loads. Any suitable number of processors or loads may be used. For example, a single processor or multiple processors may manage dozens of loads in any suitable combination. The loads may include any number of water heaters, refrigerators, pools, HVAC systems, and/or any other suitable devices or systems.

The first processor 442 and the second processor 452 may receive the regulation signal 430 from the balancing authority 410. The first processor 442 and the second processor 452 may each be customized for their respective type of load (for example, turning off a pool pump may be controlled differently that turning off a chiller or freezer). The first PCC 444 and the second PCC 454 may be connected to the power grid 420.

In some embodiments, the loads may be of the same type. In such an embodiment, each processor may execute the same control algorithm to determine whether its respective load is to be turned on or off, or to some other of multiple discrete, finite states of power. In some embodiments, these algorithms are applied to determine whether to modify an operating state determined by other control algorithms. For example, a conventional controller for a pool pump may turn a pool pump on about two to four times per day based on checking of the regulation signal 430 performed in 15-minute cycles. Alternatively, checking of the regulation signal 430 may be performed in 1-minute cycles or at any other suitable interval. The controller may determine that the pool pump should be off only when, in accordance with an operating cycle set by another control algorithm, that pump would otherwise be on. In that scenario, the determination that the pool pump should be off may be implemented disconnecting power to the pool pump, sending a command to shut down or in any other suitable way. Alternatively, if the pool pump is already off, the determination to turn off a pool pump may be implemented by deferring the next scheduled on cycle.

In other embodiments, the control algorithm may turn the pump on (or off) taking into account the operating state of the pool pump, including how long it has been off (or on), or other state variables. In such an embodiment, for example, when the regulation signal 430 indicates that power supply is greater than demand, the probabilistic function applied by the controller may determine an operating state with a relative probability that the pool pump will be turned on. In this scenario, the pump may complete its on cycle while power is available, decreasing the probability that it will operate at a later time, when power supply may be less than the demand. The inventors have recognized and appreciated that the controller may vary power to components of a pool in a way that maintains its cleanliness and is unnoticeable to the owner or user of the pool.

According to other embodiments, different types of loads may be associated with controllers that execute control algorithms based on different probability functions. In such an embodiment, the first processor 442 may determine whether to modify a state of power of the first PCC 444 based on a first probability function and the received regulation signal 430. For example, modifying the state of power of the first PCC 444 may include controlling the first PCC 444 to turn on or off.

Regardless, the controllers may impose criteria, which may be separate from the probability function, to determine the power state of the load. For example, the first processor 442 may modify the state of power so that a temperature in the customer premises changes by no more than 0.2 degrees Celsius relative to a user specified.

According to some embodiments, the first processor 442 may modify the state of power of the first PCC 444 based, at least in part, on a determination to modify the state of power. For example, if the first processor 442 executes the first probability function using the received regulation signal 430 as an input and determines that the power to the first PCC 444 should be turned on or off (or some other of multiple discrete, finite states of power), the first processor 442 may turn the power on or off accordingly.

According to some embodiments, loads with discrete, finite states of power or on/off loads may be used to provide ancillary services for only a portion of the need as reflected by the regulation signal 430. That portion may be determined by frequency components of the regulation selection, such that the regulation signal 430 generated by a balancing authority 410 may be filtered before being used to select an operating state of a load. For example, the first processor 442 may filter the received regulation signal 430 in order to generate a regulatory signal. Additionally, the first processor 442 may control the first PCC 444 based, at least in part, on the generated regulatory signal. The first processor 442 may directly use the generated regulatory signal instead of or in addition to the received regulation signal 430 in performing other actions. Additionally, the first processor 442 may receive program code to use to determine whether to modify the state of power of the first PCC 444. The program code may be used to remotely control the first processor 442.

According to some embodiments, the second processor 452 may perform similar functions for the second load 450 and the second PCC 454, including filtering the received regulation signal 430 to generate the regulatory signal, controlling the second PCC 454 based on the generated regulatory signal, determining whether to modify the state of power based on a second probability function and the received regulation signal 430, and modifying the state of power of the second PCC 454 based on the determination.

Because the control algorithm executed by a controller may depend on the specific type of load, each controller may be programmable so that it may be customized for a specific load or type of load. Customization may be performed in any suitable way, including by user input that specifies limits on operating parameters of the load. For example, user input may specify a percentage of time that a load is to be powered on, time between being powered off, etc. Alternatively or additionally, such inputs may specify permitted deviations from the consumer's nominal setting. For example, for a controller controlling a water heater, user input may specify a deviation from a temperature set point. Alternatively or additionally, the control algorithm may depend on the type of load. For example, a refrigerator may have a different control algorithm than a pool pump or irrigation system. These control algorithms may be specified by programs or data values stored in memory in the controller. Accordingly, operation of a controller may include receiving program code to use to determine whether to modify a state of power of the second PCC 454.

According to some embodiments, the first probability function may be based on an internal state of the first PCC 444 (which may be transmitted from the first PCC 444 to the first processor 442) and a value of the received regulation signal 430. Similarly, the second probability function may be based on an internal state of the second PCC 454 and the value of the received regulation signal 430. An internal state of the first PCC 452 and/or the second PCC 454 may include the current state or a previous state of power of the respective PCC (e.g., on or off). For example, the internal state may be any of the following: the length of time since the last transition of the power state (e.g., the length of time the respective PCC has been off), the quality of the service currently provided by the respective PCC (e.g., the current temperate of water heated by the respective PCC or a deviation from a desired temperature setpoint), parameters otherwise affected by operation of the respective load, or any other suitable parameter. The value of the received regulation signal 430 may be its current value at the time of execution of the respective probability function. According to some embodiments, the first probability function may include one or more probability mass functions associated with one or more Markov transition matrices, as described above.

According to some embodiments, the first probability function may be different from the second probability function. For example, when the first probability function causes the first processor 442 to turn off the first PCC 444, the second probability function may cause the second processor 452 to turn on or leave on the second PCC 454 based on the same regulation signal 430. The first probability function need not cause the first processor 442 to act differently than the second processor 452 in every situation, however.

Figure 12:
FIG. 12 is an illustration of an exemplary pool and pool pump according to some embodiments.
Figure 13:
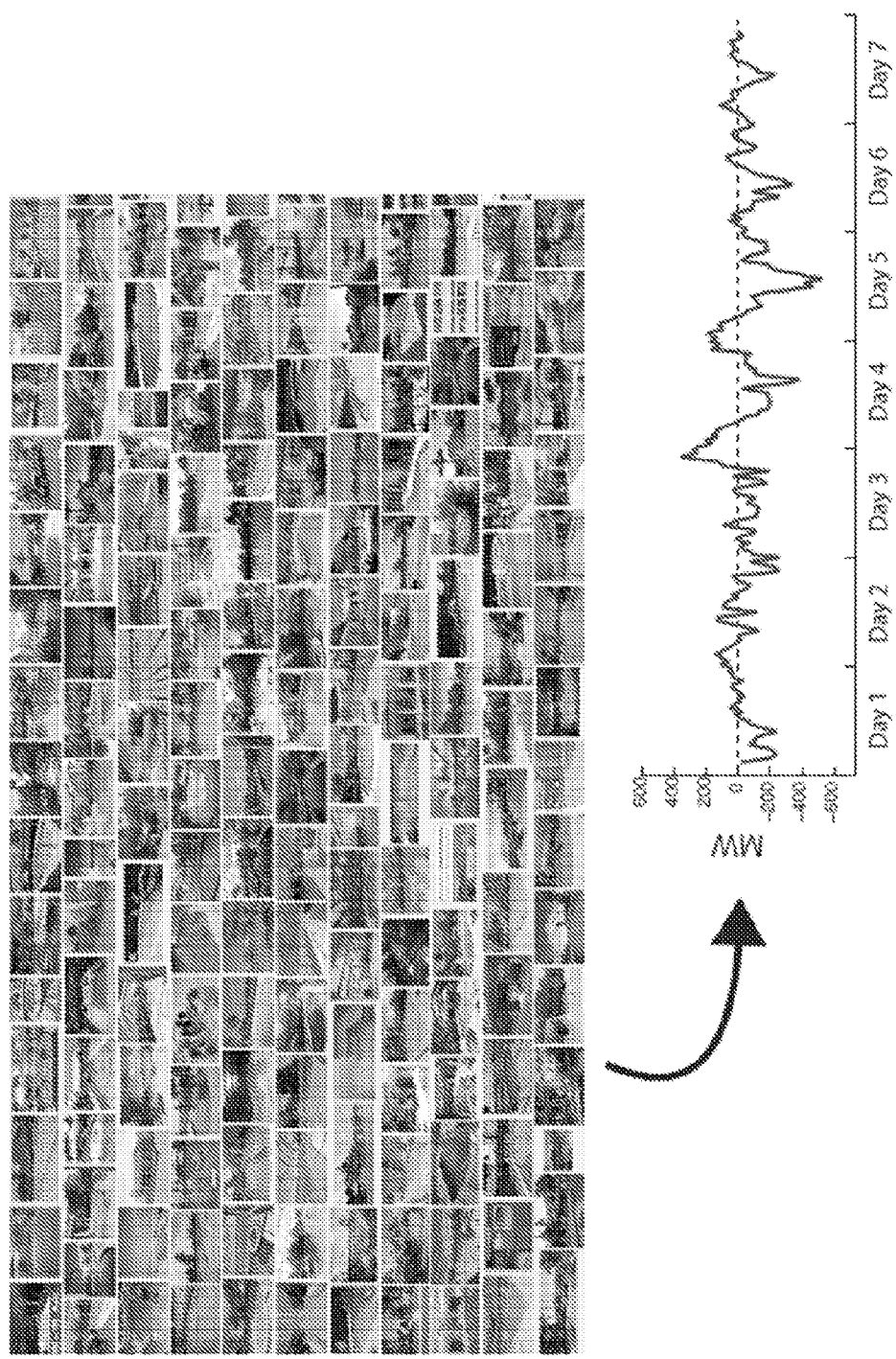
FIG. 13 is an illustration of an exemplary multitude of pools and the corresponding power consumption deviation of their equipment according to some embodiments.
Figure 14:
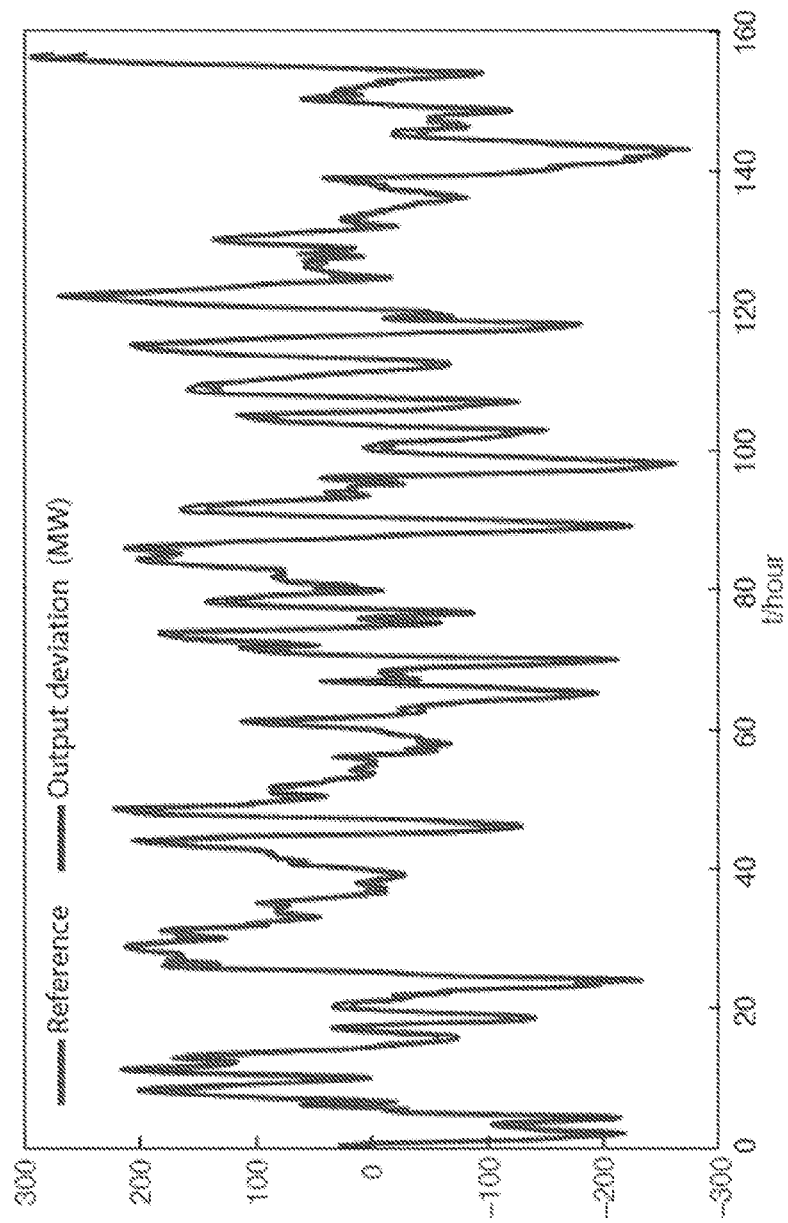
FIG. 14 is a chart illustrating a stochastic simulation using 100,000 pools according to some embodiments.

According to some embodiments, the first PCC 444 may comprise a pool pump or other pool equipment (or any other suitable component) at a customer's home or premises, such as the pump illustrated in FIG. 12. Additionally, the second PCC 454 may comprise at least one component of an HVAC system at a customer's premises, such as a chiller. Alternatively, the second PCC 454 may comprise a water pump or any other pool equipment or other suitable component. The second PCC 454 may alternatively comprise a refrigeration system. The first PCC 444 and the second PCC 454, and the first load 440 and the second load 450, respectively, may be at separate customer premises. For example, FIG. 13 illustrates a multitude of pools with equipment that can be controlled to produce, in combination, a power consumption deviation like that shown. FIG. 14 illustrates a stochastic simulation using 100,000 pools according to some embodiments. FIG. 14 shows variation in power consumption in response to a regulation signal. The trace showing variation in load is, on the scale shown, virtually indistinguishable from the reference signal indicating a need to change the load to match available power supply.

According to some embodiments, different loads are distinguished by the frequency range (or bandwidth) of ancillary service that they can offer. The first load 440 may respond to a high frequency component of the regulation signal 430, while the second load 450 may respond to a low frequency component of the regulation signal 430. According to some embodiments, the balancing authority 410 may act as a filter to control loads differently based on the frequency tracking capability of each class of loads. Alternatively, the first processor 442 and the second processor 452 may act as filters to control their respective loads differently based on their feasible frequency range (or bandwidth). That is, each class or type of load may use its own bandwidth, which may be based on quality of service constraints and costs.

According to some embodiments, the first processor 442 and/or the second processor 452 may be programmable flow rate controllers. For example, the programmable flow rate controllers may control air flow rates at various customer premises. Alternatively, the first processor 442 and/or the second processor 452 may be programmable thermostats, which may control the set temperature at various customer premises.

Figure 7:
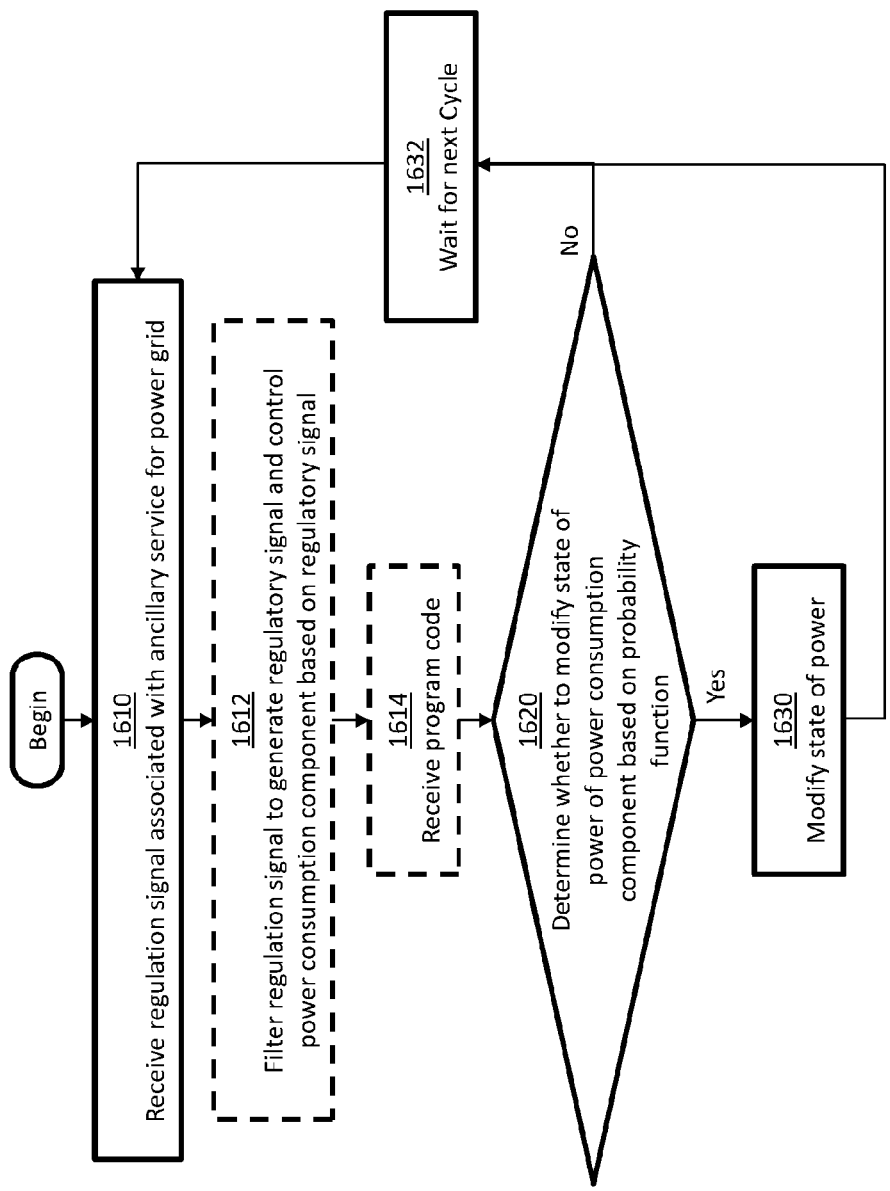
FIG. 7 is a flowchart of a method for providing ancillary services to a power grid using a power consumption component (PCC) at a customer premises according to some embodiments.

It should be appreciated from the foregoing that some embodiments are directed to a method for providing ancillary services to a power grid using a PCC at a customer premises, as illustrated in FIG. 7. The method begins at act 1610, at which a regulation signal 430 associated with an ancillary service for a power grid 420 may be received. The method then optionally proceeds to act 1612, at which the received regulation signal 430 may be filtered, and the PCC may be controlled based on the filtered regulatory signal. Optionally, the method then proceeds to act 1614, at which program code may be received for use in act 1620.

Receiving code, for example, may enable a programmable controller at the customer premises to implement control based on a specific device, or to implement control based on current operating conditions of the power distribution system, environmental conditions, or to accommodate any other conditions that may impact a desired control algorithm for a load. It should be appreciated that the conditions that may impact a desired control may change on a much longer time scale than the processing loop shown in FIG. 7. For example, different control algorithms may be used in summer versus in winter such that code is downloaded two to four times per year. Alternatively, a control code may be downloaded when new equipment acting as a load is installed. Accordingly, it should be appreciated that act 1614 may not occur each time the loop illustrated in FIG. 7 is repeated.

Figure 16:
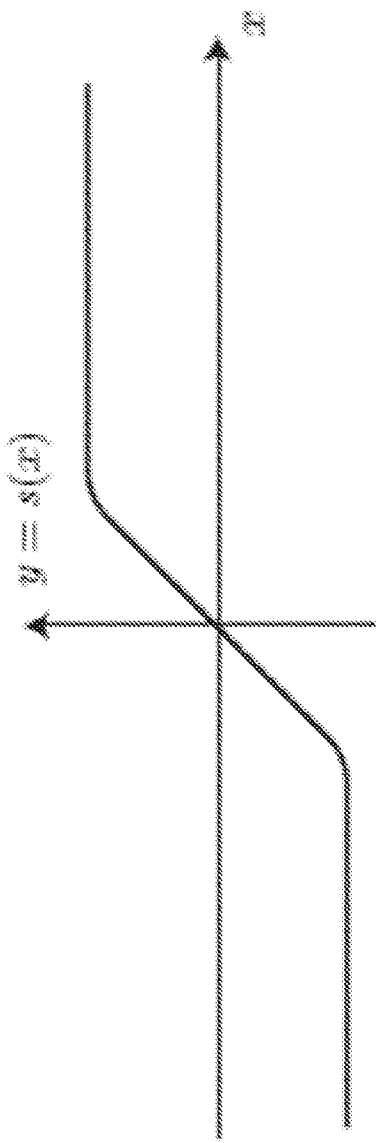
FIG. 16 is an exemplary threshold function that may be used in a mathematical model for controlling a collection of loads.

In some embodiments of the method, the grid operator will require a mathematical model to control a collection of loads. For example, such a model may be used in allocating power deviation signals to several classes of loads with distinct tracking capabilities and/or capacities. A technique for this known as model predictive control (MPC) may be used for this purpose. Such a technique may require mathematical models of each resource to be controlled. A practical model for a collection of loads is a linear system, following by a threshold:

$$y_t^0 + a_1 y_{t-1}^0 + \ldots + a_n y_{t-n}^0 = b_0 \zeta_t + b_1 \zeta_{t-1} + \ldots + b_m \zeta_{t-m}$$
where $y_t = s(y_t^0)$ The threshold function s is linear near the origin, and constant outside of a dead-band, as shown in FIG. 16.

Numerical results in our research justify a mathematical model of this form.

The method then proceeds to act 1620, at which it is determined whether to modify the state of power of the PCC based on a probability function and the received regulation signal 430, the generated regulatory signal, and/or the received program code.

If it is determined to modify the state of power, the method then proceeds to act 1630, at which the state of power of the PCC is modified based at least in part on that determination. Alternatively, if it is determined not to modify the state of power, the method may loop back to act 1610 through act 1632. At act 1632, the system may wait until the next operating cycle to again check the state of the load should change, repeating the method for additional and/or future values of the regulation signal 430.

REFERENCES

The following references are incorporated herein by reference in their entireties:

[1] Callaway, D. S. and Hiskens, I. A. Achieving controllability of electric loads. *Proceedings of the IEEE*, 99(1): 184-199, 2011.

[2] Agricultural Demand Response Program in California Helps Farmers Reduce Peak Electricity Usage, Operate More Efficiently Year-Round.

[3] Buildings Energy Data Book.

[4] Commercial Buildings Energy Consumption Survey (CBECS): Overview of Commercial Buildings, 2003. Technical report, Energy information administration, Department of Energy, U.S. Govt., 2008.

[5] Eyer, J. and Corey, G. Energy storage for the electricity grid: Benefits and market potential assessment guide. *Sandia National Laboratories Report, SAND*2010-0815, Albuquerque, N. Mex., 2010.

[6] Koch, S. and Mathieu, J. and Callaway, D. Modeling and control of aggregated heterogeneous thermostatically controlled loads for ancillary services. *Proc. PSCC*, pages 1-7, 2011.

[7] Soumya Kundu and Nikolai Sinitsyn and Scott Backhaus and Ian Hiskens. Modeling and control of thermostatically controlled loads. *Arxiv preprint arXiv*:1101.2157, 2011.

[8] PJM Regulation Data.

[9] PJM Regulation Market Clearing Price.

[10] Braun, J. E. Reducing energy costs and peak electrical demand through optimal control of building thermal storage. *ASHRAE transactions*, 96(2):876-888, 1990.

[11] Mathieu, J. L. and Callaway, D. S. State Estimation and Control of Heterogeneous Thermostatically Controlled Loads for Load Following. *2012 45th Hawaii International Conference on System Sciences*, pages 2002-2011, 2012. IEEE.

[12] Todd, D. W. and Caufield, M. and Helms, B. and Generating, A. P. and Starke, I. M. and Kirby, B. and Kueck, J. Providing Reliability Services through Demand Response: A Preliminary Evaluation of the Demand Response Capabilities of Alcoa Inc. *ORNL/TM*, 233, 2008.

[13] Weather Underground.

[14] Braun, J. E. and Kim, D. and Baric, M. and Li, P. and Narayanan, S. and Yuan, S. and Cliff, E. and Burns, J. A. and Henshaw, B. Whole Building Control System Design and Evaluation: Simulation-Based Assessment. 2012.

[15] Eric Hirst and Brendan Kirby. Electric Power Ancillary Services. Technical report, ORNLCON-426, Oak Ridges National Laboratory, Oak Ridge, Tenn., 1996.

[16] Yashen Lin and Prabir Barooah. Issues in identification of control-oriented thermal models of zones in multi-zone buildings. *IEEE Conference on Decision and Control*, 2012.

[17] Makarov, Y. V. and Lu. S. and Ma, J. and Nguyen, T. B. Assessing the Value of Regulation Resources Based on Their Time Response Characteristics. Technical report, PNNL-17632, Pacific Northwest National Laboratory, Richland, Wash., 2008.

[18] Makarov, Y. V. and Loutan, C. and Jian Ma and de Mello, P. Operational Impacts of Wind Generation on California Power Systems. *IEEE Transactions on Power Systems*, 24(2):1039-1050, 2009.

[19] Smith, J. C. and Milligan, M. R. and DeMeo, E. A. and Parsons, B. Utility Wind Integration and Operating Impact State of the Art. *IEEE Transactions on Power Systems*, 22(3):900-908, 2007.

[20] Khoi Vu and Masiello, R. and Fioravanti, R. Benefits of fast-response storage devices for system regulation in ISO markets. *IEEE Power Energy Society General Meeting*, 2009, pages 1-8, 2009.

[21] First 'Small Scale' Demand-side Projects in PJM Providing Frequency Regulation. http://www.sacbee.com/2011/11/21/v-print/4070973/first-small-scale-demand-side.html, 2011.

[22] ASHRAE. The ASHRAE Handbook HVAC Systems and Equipment (SI Edition). 2008.

[23] Siddharth Goyal and Prabir Barooah. A Method for Model-Reduction of Nonlinear Building Thermal Dynamics of Multi-Zone Buildings. *Energy and Buildings*, 47:332-340, 2012.

[24] Meyn, S. and Negrete-Pincetic, M. and Gui Wang and Kowli, A. and Shafieepoorfard, E. The value of volatile resources in electricity markets. *CDC*2010, pages 1029-1036, 2010. And submitted to IEEE TAC, 2012.

[25] Schweppe, F. C. and Tabors, R. D. and Kirtley, J. L. and Outhred, H. R. and Pickel, F. H. and Cox, A. J. Homeostatic Utility Control. *IEEE Transactions on Power Apparatus and Systems*, PAS-99(3):1151-1163, 1980.

[26] Paul Steffes. Grid-Interactive Renewable Water Heating: Analysis of the Economic and Environmental Value. http://www.steffes.com/LiteratureRetrieve.aspx?ID=72241.

[27] Xu, P. and Haves, P. and Piette, M. A. and Braun, J. Peak demand reduction from pre-cooling with zone temperature reset in an office building. 2004.

[28] Bonneville Power Authority, http://transmission.bpa.gov/business/operations/Wind/baltwg.aspx.

[29] S. P. Meyn and R. L. Tweedie. *Markov chains and stochastic stability*. Cambridge University Press, Cambridge, second edition, 2009. Published in the Cambridge Mathematical Library. 1993 edition online.

[30] Sean Meyn, Prabir Barooah, Ana Busic, Yue Chen, and Jordan Ehren. Ancillary service to the grid using intelligent deferrable loads. ArXiv e-prints: arXiv: 1402.4600 and to appear, *IEEE Trans. on Auto. Control*, 2014.

[31] R. Srikant. *The mathematics of Internet congestion control*. Systems & Control: Foundations & Applications. Birkhauser Boston Inc., Boston, Mass., 2004.

[32] A. Brooks, E. Lu, D. Reicher, C. Spirakis, and B. Weihl. Demand dispatch. IEEE Power and Energy Magazine, 8(3):20-29, May 2010.

[33] H. Hao, T. Middelkoop, P. Barooah, and S. Meyn. *How demand response from commercial buildings will provide the regulation needs of the grid*. In 50th Allerton Conference on Communication, Control, and Computing, pages 1908-1913, 2012.

[34] H. Hao, Y. Lin, A. Kowli, P. Barooah, and S. Meyn. *Ancillary service to the grid through control of fans in commercial building HVAC systems. IEEE Trans. on Smart Grid*, 5(4):2066-2074, July 2014.

[35] D. Callaway and I. Hiskens, Achieving controllability of electric loads. *Proceedings of the IEEE*, vol. 99, no. 1, pp. 184-199, 2011.

[36] P. Xu, P. Haves, M. Piette, and J. Braun, *Peak demand reduction from pre-cooling with zone temperature reset in an office building*, 2004.

[37] D. Watson, S. Kiliccote, N. Motegi, and M. Piette, *Strategies for demand response in commercial buildings*. In Proceedings of the 2006 ACEEE Summer Study on Energy E_ciency in Buildings, August 2006.

[38] A. Brooks, E. Lu, D. Reicher, C. Spirakis, and B. Weihl. Demand dispatch. *IEEE Power and Energy Magazine*, 8(3):20-29, May 2010.

[39] K. Christakou, D.-C. Tomozei, J.-Y. Le Boudec, and M. Paolone. GECN: primary voltage control for active distribution networks via real-time demand-response. *IEEE Trans. on Smart Grid*, 5(2):622-631, March 2014.

[40] J. L. Mathieu, S. Koch, and D. S. Callaway. State estimation and control of electric loads to manage real-time energy imbalance. *IEEE Trans. Power Systems*, 28(1):430-440, 2013.

[41] B. J. Kirby. Frequency regulation basics and trends. Report prepared for the US DoE—ORNL/TM-2004/291, OAK RIDGE NATIONAL LABORATORY, 2004.

Computing Environment

Figure 15:
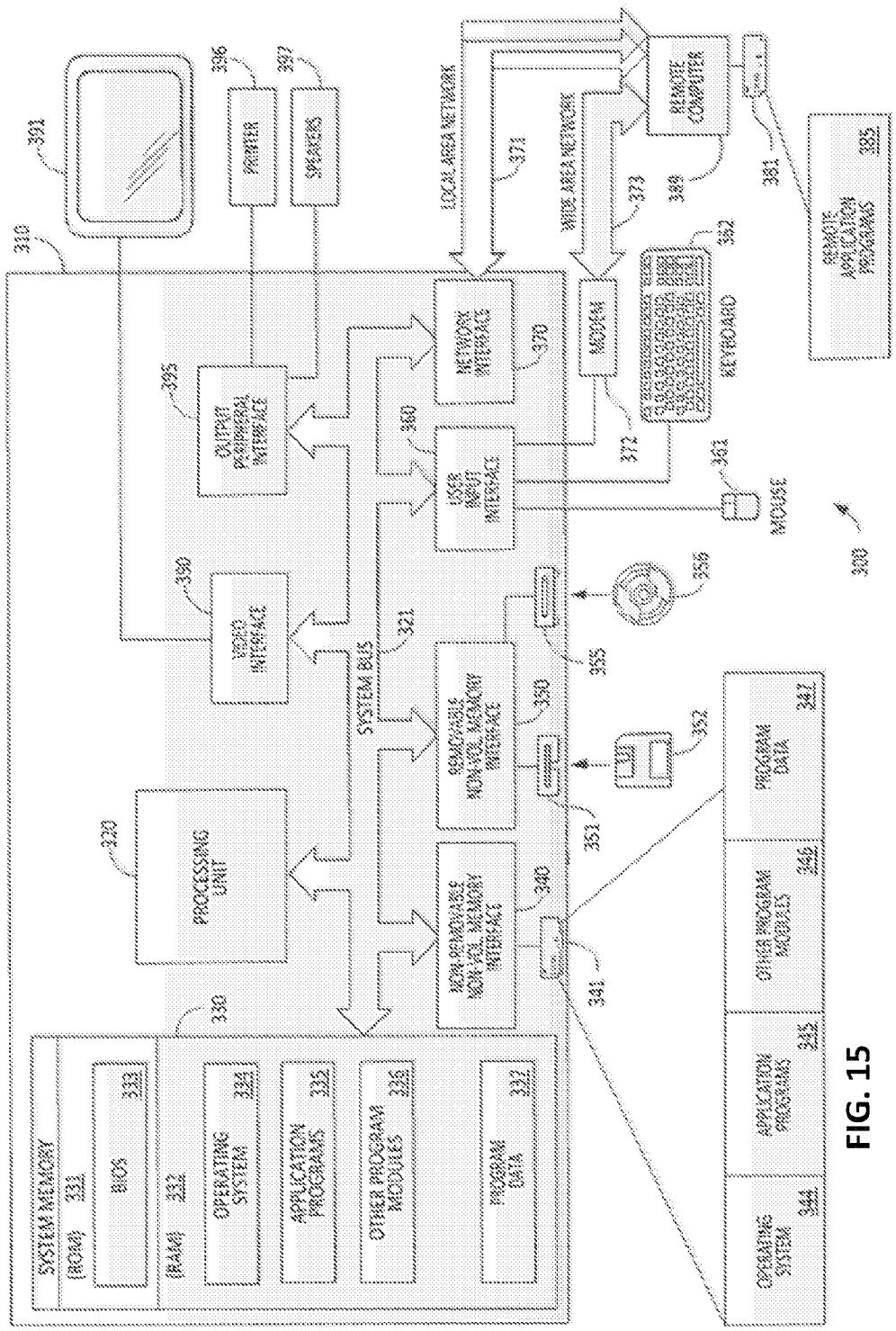
FIG. 15 is a diagram illustrating a computer system on which some embodiments of the invention may be implemented.

Control techniques to generate or use a regulation system at a customer premises may be implemented on any suitable hardware, including a programmed computing system. FIG. 15 illustrates an example of a suitable computing system environment 300 on which embodiments the invention may be implemented. This computing system may be representative of a computing system that implements the described technique of providing ancillary services to a power grid using loads with discrete, finite states of power or on/off loads at a customer premises. However, it should be appreciated that the computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments or cloud-based computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 15, an exemplary system for implementing the invention includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 15 illustrates operating system 334, application programs 335, other program modules 336, and program data 337.

The computer 310 may also include other removable/non-removable, volatile/nonvolatile computer storage media. By way of example only, FIG. 15 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 15, provide storage of computer readable instructions, data structures, program modules and other data for the computer 310. In FIG. 15, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 15. The logical connections depicted in FIG. 15 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 15 illustrates remote application programs 385 as residing on memory device 381. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

As another example, batteries and other sources may be used to address regulation at very high frequencies. At ultra-low frequencies, flexible manufacturing (e.g., desalination and aluminum manufacturing) may be used for providing ancillary services.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus for providing ancillary services to a power grid using a power consumption component at a customer premises, the apparatus comprising:
  a processor configured to:
    receive a regulation signal associated with an ancillary service for the power grid;
    receive data indicative of a condition at the premises; and
    determine whether to modify a state of power of the power consumption component based on a probability function, the data indicative of the condition at the premises, and the received regulation signal, wherein (1) the power consumption component has a plurality of discrete, finite states of power, and (2) the probability function is determined based at least in part on a transition matrix, an internal state of the power consumption component, and the received regulation signal.

2. The apparatus of claim 1, wherein:
the processor is configured to modify the state of power of the power consumption component by controlling the power consumption component to be in one of the plurality of discrete, finite states of power based at least in part on a determination to modify the state of power of the power consumption component.

3. The apparatus of claim 1, wherein:
the processor is configured to modify the state of power of the power consumption component by controlling the power consumption component to be in an on state or an off state based at least in part on a determination to modify the state of power of the power consumption component.

4. The apparatus of claim 1, wherein:
the apparatus is associated with the power consumption component.

5. The apparatus of claim 1, wherein:
the internal state of the power consumption component comprises a state at a current and/or previous time.

6. The apparatus of claim 1, wherein:
the regulation signal is received from a balancing authority that provides the regulation signal to other power consumption components at other customer premises.

7. The apparatus of claim 1, wherein:
the power consumption component is a portion of a heating and/or cooling system, and
the processor is configured to determine whether to modify the state of power so that a temperature in the customer premises changes by no more than 0.2 degrees Celsius relative to a user specified temperature.

8. The apparatus of claim 1, wherein:
the power consumption component comprises pool equipment.

9. The apparatus of claim 8, wherein:
the pool equipment comprises a pool pump that has two states of power of off and on or four states of power of off, low, medium, and high.

10. The apparatus of claim 1, wherein:
the processor comprises a programmable flow rate controller.

11. The apparatus of claim 1, wherein:
the processor comprises a programmable thermostat.

12. The apparatus of claim 1, wherein:
the processor is programmable and is configured to receive program code to use to determine whether to modify the state of power.

13. The apparatus of claim 1, wherein:
the processor is further configured to filter the received regulation signal to generate a regulatory signal used for control of the power consumption component.

14. A method for providing ancillary services to a power grid using a power consumption component at a customer premises, the method comprising:
receiving a regulation signal associated with an ancillary service for the power grid;
determining whether to modify a state of power of the power consumption component based on a probability function and the received regulation signal, wherein (1) the power consumption component has a plurality of discrete, finite states of power, and (2) the probability function is determined based at least in part on a transition matrix, an internal state of the power consumption component, and the received regulation signal; and
based at least in part on a determination to modify the state of power of the power consumption component, modifying the state of power of the power consumption component.

15. The method of claim 14, wherein:
modifying the state of power of the power consumption component comprises controlling the power consumption component to be in one of the plurality of discrete, finite states of power.

16. The method of claim 14, wherein:
modifying the state of power of the power consumption component comprises controlling the power consumption component to be in an on state or an off state.

17. The method of claim 14, wherein:
the internal state of the power consumption component comprises a state at a current and/or previous time.

18. The method of claim 14, wherein:
receiving the regulation signal comprises receiving the regulation signal from a balancing authority that provides the regulation signal to other power consumption components at other customer premises.

19. The method of claim 14, wherein:
the power consumption component is a portion of a heating and/or cooling system, and
modifying the state of power comprises modifying the state of power so that a temperature in the customer premises changes by no more than 0.2 degrees Celsius relative to a user specified temperature.

20. The method of claim 14, wherein:
the power consumption component comprises pool equipment.

21. The method of claim 20, wherein:
the pool equipment comprises a pool pump that has two states of power of off and on.

22. The method of claim 20, wherein:
the pool equipment comprises a pool pump that has four states of power of off, low, medium, and high.

23. The method of claim 14, wherein:
the method further comprises receiving program code; and
determining whether to modify the state of power of the power consumption component comprises determining whether to modify the state of power using the received program code.

24. The method of claim 14, further comprising:
filtering the received regulation signal to generate a regulatory signal; and
controlling the power consumption component based at least in part on the generated regulatory signal.

25. A system for providing ancillary services to a power grid based on a regulation signal associated with an ancillary service for the power grid transmitted by a balancing authority, the system comprising:
a first load comprising a first power consumption component and a first processor configured to:
receive the regulation signal;
determine whether to modify a state of power of the first power consumption component based on a first probability function and the received regulation signal, wherein (1) the first power consumption component has a first plurality of discrete, finite states of power, and (2) the first probability function is determined based at least in part on a first transition matrix, an internal state of the first power consumption component, and the received regulation signal; and based at least in part on a determination to modify the state of power of the first power consumption component, modify the state of power of the first power consumption component; and a second load comprising a second power consumption component and a second processor configured to:

receive the regulation signal;

determine whether to modify a state of power of the second power consumption component based on a second probability function and the received regulation signal; and based at least in part on a determination to modify the state of power of the second power consumption component, modify the state of power of the second power consumption component.

26. The system of claim 25, wherein:
the first processor and the second processor are the same processor.

27. The system of claim 25, wherein:
the first probability function is different from the second probability function.

28. The system of claim 25, wherein:
the second probability function is based on an internal state of the second power consumption component and the value of the received regulation signal.

29. The system of claim 25, wherein:
the first power consumption component comprises a pool pump, a water heater, a refrigerator, or an air conditioner.

* * * * *